(12) United States Patent
Yoshida et al.

(10) Patent No.: US 8,388,866 B2
(45) Date of Patent: Mar. 5, 2013

(54) CONDUCTIVE COMPOSITION AND CONDUCTIVE CROSS-LINKED PRODUCT, CAPACITOR AND PRODUCTION METHOD THEREOF, AND ANTISTATIC COATING MATERIAL, ANTISTATIC COATING, ANTISTATIC FILM, OPTICAL FILTER, AND OPTICAL INFORMATION RECORDING MEDIUM

(75) Inventors: Kazuyoshi Yoshida, Kazo (JP); Tailu Ning, Saitama (JP); Yasushi Masahiro, Saitama (JP); Yutaka Higuchi, Saitama (JP); Rika Abe, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 0 days.

(21) Appl. No.: 13/296,456

(22) Filed: Nov. 15, 2011

(65) Prior Publication Data

US 2012/0057269 A1    Mar. 8, 2012

Related U.S. Application Data

(62) Division of application No. 12/644,858, filed on Dec. 22, 2009, which is a division of application No. 11/211,557, filed on Aug. 25, 2005, now Pat. No. 7,666,326.

(30) Foreign Application Priority Data

| Aug. 30, 2004 | (JP) | P2004-249993 |
| Aug. 30, 2004 | (JP) | P2004-249994 |
| Sep. 24, 2004 | (JP) | P2004-277168 |
| Mar. 28, 2005 | (JP) | P2005-090322 |
| Mar. 28, 2005 | (JP) | P2005-090323 |
| Mar. 30, 2005 | (JP) | P2005-096599 |
| Apr. 5, 2005 | (JP) | P2005-108539 |

(51) Int. Cl.
*H01B 1/00* (2006.01)
*H01G 4/06* (2006.01)
*H01G 9/02* (2006.01)

(52) U.S. Cl. .......... 252/500; 361/524; 361/525
(58) Field of Classification Search ........ 252/500–521.6; 361/525
See application file for complete search history.

(56) References Cited

U.S. PATENT DOCUMENTS
(Continued)

FOREIGN PATENT DOCUMENTS

| JP | 63-158829 | 7/1988 |
| JP | 63-173313 | 7/1988 |

(Continued)

OTHER PUBLICATIONS

Office Action dated Jun. 14, 2011 issued in corresponding Japanese Patent Application No. 2005-090323 with English translation (7 pages).

(Continued)

*Primary Examiner* — Mark Kopec
*Assistant Examiner* — Jaison Thomas
(74) *Attorney, Agent, or Firm* — Ostrolenk Faber LLP

(57) ABSTRACT

A conductive composition comprises a π conjugated conductive polymer, a dopant, and a nitrogen-containing aromatic cyclic compound. A capacitor comprises an anode composed of a porous material of valve metal, a dielectric layer formed by oxidizing the surface of the anode, and a cathode provided on the dielectric layer and having a solid electrolyte layer containing a π conjugated conductive polymer, which comprises an electron donor compound containing an electron donor element provided between the dielectric layer and the cathode. Another capacitor is based on the above-described capacitor, wherein the solid electrolyte layer further comprises a dopant and a nitrogen-containing aromatic cyclic compound. An antistatic coating material comprises a π conjugated conductive polymer, a solubilizing polymer containing an anion group and/or an electron attractive group, a nitrogen-containing aromatic cyclic compound, and a solvent. An antistatic coating is formed by applying the antistatic coating material.

9 Claims, 2 Drawing Sheets

U.S. PATENT DOCUMENTS

| | | | | |
|---|---|---|---|---|
| 4,933,106 | A | 6/1990 | Sakai et al. | 252/500 |
| 5,171,478 | A | 12/1992 | Han | 252/500 |
| 5,232,631 | A | 8/1993 | Cao et al. | 252/500 |
| 5,729,428 | A * | 3/1998 | Sakata et al. | 361/523 |
| 6,066,269 | A | 5/2000 | Wei et al. | 252/500 |
| 6,132,644 | A | 10/2000 | Angelopoulos et al. | 252/500 |
| 6,229,689 | B1 * | 5/2001 | Kobayashi et al. | 361/525 |
| 6,307,735 | B1 | 10/2001 | Saito et al. | 361/517 |
| 6,344,966 | B1 | 2/2002 | Monden et al. | 361/524 |
| 6,430,033 | B1 | 8/2002 | Mitsui et al. | 361/525 |
| 6,920,036 | B1 * | 7/2005 | Tseng et al. | 361/525 |
| 7,064,178 | B2 | 6/2006 | Lee et al. | 528/272 |
| 7,082,027 | B2 | 7/2006 | Nobuta et al. | 361/502 |
| 7,471,503 | B2 * | 12/2008 | Bruner et al. | 361/525 |
| 2001/0012572 | A1 | 8/2001 | Araki | 428/690 |
| 2003/0147202 | A1 | 8/2003 | Kudoh et al. | 361/523 |
| 2006/0019090 | A1 | 1/2006 | Wessling | 428/336 |
| 2006/0051707 | A1 | 3/2006 | Shia et al. | 430/281.1 |
| 2010/0302714 | A1 | 12/2010 | Kobayakawa et al. | 361/529 |

FOREIGN PATENT DOCUMENTS

| | | |
|---|---|---|
| JP | 1-254764 | 10/1989 |
| JP | A-02-249221 | 10/1990 |
| JP | 4-133275 | 5/1992 |
| JP | 6-112094 | 4/1994 |
| JP | A-06-163329 | 6/1994 |
| JP | H06-163329 | 6/1994 |
| JP | 7-105718 | 4/1995 |
| JP | 7-165892 | 6/1995 |
| JP | 8-48858 | 2/1996 |
| JP | A-08-293436 | 11/1996 |
| JP | 2636968 B2 | 8/1997 |
| JP | 10-507225 | 7/1998 |
| JP | 11-045824 | 2/1999 |
| JP | 11-74157 | 3/1999 |
| JP | H11-283874 | 10/1999 |
| JP | 2000-21687 | 1/2000 |
| JP | 2001-102255 | 4/2001 |
| JP | A-2001-230156 | 8/2001 |
| JP | 2002-311536 | 10/2001 |
| JP | 2003-37024 | 2/2003 |
| JP | 2003-213148 | 7/2003 |
| JP | 2003-289015 | 10/2003 |
| JP | 2003-289016 | 10/2003 |
| JP | 2003289016 A * | 10/2003 |
| JP | A-10-2003-289016 | 10/2003 |
| JP | 2004-59733 | 2/2004 |
| JP | 2004-253537 | 9/2004 |
| JP | 2005-123630 | 10/2004 |
| JP | 2005-123630 | 5/2005 |
| JP | 2005-175015 | 6/2005 |
| JP | 2005-191127 | 7/2005 |
| KR | 2002-0061924 | 7/2002 |
| WO | WO 92/11645 A1 | 7/1992 |
| WO | WO 96/22317 | 7/1996 |
| WO | WO 99/60586 | 11/1999 |
| WO | WO 2004/018560 | 3/2004 |

OTHER PUBLICATIONS

Notice of Allowance mailed May 31, 2011 in corresponding Japanese Patent Application No. 2005-096599, along with English translation thereof.
Notice of Allowance dated Feb. 17, 2011 issued in corresponding U.S. Appl. No. 12/645,022.
Japanese Office Action dated Mar. 1, 2011 with English translation.
English translation of Office Action issued on counterpart Japanese Patent Application No. 2005-108539 dated Nov. 30, 2010.
Japanese Office Action for Japanese Application No. JP 2005-090322 mailed Mar. 9, 2010.
Japanese Office Action for Japanese Application No. JP 2005-096599 mailed Mar. 9, 2010.
Japanese Notification, dated Oct. 6, 2009, issued in corresponding Japanese Patent Application No. 2005-096599, 11 pages; English Translation attached, 15 pages.
Fine Chemical Antistatic Agents Latest Market Trend (the first volume),: vol. 16, No. 15, 1987, p. 24-36, Published by CMC Publishing Co., Ltd.
Official Action issued in corresponding U.S. Appl. No. 12/645,022 dated Sep. 1, 2010.
Japanese Decision of Rejection dated Oct. 18, 2011 in corresponding Japanese Patent Application No. 2005-090322 (with English translation).

* cited by examiner

CONDUCTIVE COMPOSITION AND CONDUCTIVE CROSS-LINKED PRODUCT, CAPACITOR AND PRODUCTION METHOD THEREOF, AND ANTISTATIC COATING MATERIAL, ANTISTATIC COATING, ANTISTATIC FILM, OPTICAL FILTER, AND OPTICAL INFORMATION RECORDING MEDIUM

CROSS REFERENCE TO RELATED APPLICATIONS

This application is a divisional of U.S. patent application Ser. No. 12/644,858, filed on Dec. 22, 2009, which is a divisional of U.S. patent application Ser. No. 11/211,557, filed on Aug. 25, 2005, which claims priority on Japanese Patent Application No. 2004-249993, filed on Aug. 30, 2004, Japanese Patent Application No. 2004-249994, filed on Aug. 30, 2004, Japanese Patent Application No. 2004-277168, filed on Sep. 24, 2004, Japanese Patent Application No. 2005-090322, filed on Mar. 28, 2005, Japanese Patent Application No. 2005-090323, filed on Mar. 28, 2005, Japanese Patent Application No. 2005-096599, filed on Mar. 30, 2005, and Japanese Patent Application No. 2005-108539, filed on Apr. 5, 2005, the entire contents of which are incorporated herein by reference.

BACKGROUND OF THE INVENTION

1. Field of the invention

The present invention relates to a conductive compound and a conductive cross-linked product, both containing a π conjugated conductive polymer. The present invention further relates to capacitors such as aluminum, tantalum, and niobium electrolytic capacitors and a production method thereof. The present invention further relates to an antistatic coating material for imparting antistatic properties to films, an antistatic coating having antistatic properties, an antistatic film used for wrapping food products and electronic parts, an optical filter used for the front surface of liquid crystal displays and plasma displays, and an optical information recording medium such as CDs and DVDs.

2. Description of Related Art

Generally, π conjugated conductive polymers composed of the main chain of a conjugated system containing π electrons are synthesized by electrolytic polymerization or chemical oxidative polymerization.

In the electrolytic polymerization, a previously prepared base such as an electrode material is immersed in a mixed solution of an electrolyte as a dopant and precursor monomers for constituting a π conjugated conductive polymer to form a film of π conjugated conductive polymer on the base. Therefore, mass production is very difficult.

On the other hand, there are no such limitations on the chemical oxidative polymerization. A large amount of a π conjugated conductive polymer can be produced in a solution by adding oxidant and oxidation polymerization catalysis to precursor monomers of the π conjugated conductive polymer.

However, the π conjugated conductive polymer is obtained as an insoluble solid powder in the chemical oxidative polymerization because the polymer becomes less soluble in a solvent as the conjugated system of the main chain of the polymer grows. It is difficult to form a uniform film of a π conjugated conductive polymer on a base surface if the polymer is insoluble.

Therefore, some methods to solubilize the π conjugated conductive polymers have been attempted. They are a method of introducing a functional group into the polymers, a method of dispersing the polymers in a binder resin, and a method of adding an anion group-containing polymeric acid to the polymer.

For example, a method of preparing an aqueous solution of poly(3,4-dialkoxythiophene) by chemical oxidative polymerization of 3,4-dialkoxythiophene using oxidant in the presence of polystyrene sulfonic acid, which is an anion group-containing polymeric acid having a molecular weight of 2000 to 500000, in order to improve the dispersibility in water, is disclosed in Japanese Patent Publication No. 2636968. A method of preparing an aqueous colloid solution of a π conjugated conductive polymer by chemical oxidative polymerization of a precursor monomer of the polymer in the presence of polyacrylic acid, is disclosed in Japanese Unexamined Patent Application, First Publication No. 7-165892.

According to methods disclosed in Japanese Patent Publication No. 2636968 and Japanese Unexamined Patent Application, First Publication No. 7-165892, an aqueous dispersion solution containing a π conjugated conductive polymer can be easily prepared. These methods require a π conjugated conductive polymer to contain a large amount of anion group-containing polymeric acid for ensuring its dispersibility. Therefore, the problem occurs that the obtained conductive compositions contain a large amount of compounds which do not contribute to conductivity, making it difficult to achieve high conductivity.

In the chemical oxidative polymerization, high oxidative oxidants cause unfavorable side reactions in high probability during chemical oxidative polymerization. Therefore, the polymer structures having poor conjugated property may be produced, or the produced polymer may be attacked by the oxidant once again and excessively oxidized, and then the obtained π conjugated conductive polymer has low conductivity. Some methods are used to solve these problems, such as using transition metal ions as catalysis or allowing reaction at a low temperature for a long time. However, these methods fail to sufficiently prevent conductivity from dropping because the produced polymer is attacked by protons produced by dehydrogenation of reactive monomers, and, therefore, the π conjugated conductive polymer may have low structural regularity.

Furthermore, when the conductive composition contains a binder resin, a π conjugated conductive polymer obtained by the chemical oxidative polymerization may have low compatibility with the binder resin.

As an example, π conjugated conductive polymers are used in capacitors.

Along with recent digitalized electronic devices, capacitors used in those electronic devices are required to reduce impedance in high frequency range. In order to meet this requirement, conventionally, a capacitor comprises a dielectric which is an oxide film of valve metals such as aluminum, tantalum, and niobium, and a cathode comprising a π conjugated conductive polymer formed on the surface of the oxide film.

A capacitor generally comprises an anode consisting of a porous material of valve metal, a dielectric layer formed by oxidizing the surface of the anode, and a cathode formed by laminating a solid electrolyte layer, a carbon layer, and a silver layer on the dielectric layer, as shown in Japanese Unexamined Patent Application, First Publication No. 2003-37024. The solid electrolyte layer of a capacitor is composed of a π conjugated conductive polymer such as pyrrole or thiophene. The solid electrolyte layer penetrates into the porous material, and the electrolyte is in contact with the dielectric layer in a larger area for higher electrostatic capacity and restores defective parts of the dielectric layer for preventing current leakage.

Known methods of forming a π conjugated conductive polymer include electrolytic polymerization (Japanese Unexamined Patent Application, First Publication No. 63-158829) and chemical oxidative polymerization (Japanese Unexamined Patent Application, First Publication No. 63-173313).

In electrolytic polymerization, a conductive layer of manganese oxide must be previously formed on the porous material surface of the valve metal. This method is complicated and troublesome, and further manganese oxide has low conductivity and then the effect of using a high conductive π conjugated conductive polymer is impaired.

The chemical oxidative polymerization requires a long polymerization time. It also requires repeated polymerization to ensure thickness. Therefore, the capacitor suffers from low production efficiency and low conductivity.

Furthermore, a method that eliminates the step of forming a conductive polymer on a dielectric layer in the electrolytic polymerization or chemical oxidative polymerization is proposed in Japanese Unexamined Patent Application, First Publication No. 7-105718. Japanese Unexamined Patent Application, First Publication No. 7-105718 describes a method in which aniline is polymerized in the presence of a polymeric acid containing a sulfo group and carboxy group to prepare water-soluble polyaniline and the polyaniline aqueous solution is applied to the dielectric layer and dried. This method is simple. However, the polyaniline solution does not sufficiently penetrate into the porous material and a polymeric acid used along with a π conjugated conductive polymer leads to low conductivity, which, in some cases, may be temperature dependent because of the polymeric acid.

Capacitors are desired to have low equivalent series resistance (ESR), which is an index for impedance. To decrease ESR, conductivity of the solid electrolyte layer should be increased. Highly sophisticated control over conditions of the chemical oxidative polymerization is proposed to improve the conductivity of a solid electrolyte layer in Japanese Unexamined Patent Application, First Publication No. 11-74157. However, the proposed method may further complicate complicated and troublesome chemical oxidative polymerization, failing to simplify the process and reduce costs.

In some cases, π conjugated conductive polymers are used as an organic material which has a conductive mechanism of electronic conduction.

Resin films themselves are insulators and easily electrically charged. Furthermore, resin films tend to charge static electricity by friction or the like. Moreover, static electricity is not easily removed, but rather accumulates causing various problems.

Particularly, when resin films are used for wrapping food materials, in which sanitary considerations are emphasized, they may absorb dirt and dust and become largely deteriorated in appearance while on the shelves, which reduces the product's value. When resin films are used for wrapping powders, they absorb or repel powder that is charged while being wrapped or in use, making it inconvenient and difficult to handle the powder. When resin films are used for wrapping precision electronic devices, the precision electronic device may be broken due to static electricity. Therefore, steps must be taken to assure that static electricity does not occur.

Optical filters and optical information recording media are required that surfaces thereof are highly hard and transparent, and further comprise antistatic property for preventing adhesion of dust with static electricity. Particularly, the antistatic properties are required that a surface resistance value is stably within approximately 106 to 1010Ω (namely, stable antistatic properties). Therefore, an antistatic coating having antistatic and highly hard is provided on the surfaces of optical filters and optical information recording media.

For imparting antistatic properties, for example, a method that a resin film or surfactant is applied to the surface, or a method that a surfactant is mixed into a resin film or a resin composing an antistatic coating have been adopted (for example, see "Fine Chemical Antistatic Agents Latest Market Trend (the first volume)," Vol. 16, No. 15, 1987, p. 24-36, published by CMC).

However, since antistatic properties obtained by surfactants have a conductive mechanism of ion conduction, the surfactants are largely influenced by humidity, and, therefore, optical filters and optical information recording media are highly conductive at high humidity and poorly conductive at low humidity. Hence, the antistatic function is impaired and the antistatic ability is not exerted at need at low humidity and, particularly, under circumstances where static electricity easily occurs.

If metals and carbon having a conductive mechanism of electronic conduction are used, humidity-dependence is eliminated. However, since they do not have transparency, they are useless where transparency is required.

Metal oxides such as ITO (Indium Tin Oxide) have transparency and have a conductive mechanism of electronic conduction. Therefore, metal oxides are suitably used in transparency. However, if metal oxides are used, it is necessary to include a process using a sputtering apparatus or the like for making a film, so that processes are complicated and production costs become high. Furthermore, since inorganic metal oxide coatings have less flexibility, if the inorganic metal oxide is coated on a thin film base, the coating is extremely subject to cracks and does not exhibit conductivity. Moreover, since they have low adhesion property to an organic base, the inorganic metal oxide may be peeled off the organic base at the interface thereof and transparency may be decreased.

Known organic materials having a conductive mechanism of electronic conduction include π conjugated conductive polymers. Generally, π conjugated conductive polymers are insoluble and non-melting. Therefore, it is difficult to apply them to a film base after polymerization, and an attempt is made in which aniline is polymerized in the presence of a polymeric acid having a sulfo group to form a water-soluble polyaniline and the obtained mixture is applied to a film base and dried (for example, see Japanese Unexamined Patent Application, First Publication No. 1-254764).

An antistatic coating can be formed by directly polymerizing it on a base as in the method described in Japanese Unexamined Patent Application, First Publication No. 1-25476. In such a case, the antistatic coating has a low conductivity and shows poor adhesion to resin base due to water solubility, and further, the production process becomes more complicated.

SUMMARY OF THE INVENTION

In order to solve the aforementioned problems, the first object of the present invention is to provide a conductive compound and a conductive cross-linked product, both having excellent conductivity. The second object of the present invention is to provide a capacitor comprising a cathode having a highly conductive solid electrolyte layer and low impedance and a method of producing the capacitor in a simple manner. The third object of the present invention is to provide an antistatic coating material which forms an antistatic coating having highly conductivity, flexibility, and adhesion properties to a base by simple application; an antistatic coating having highly conductivity, flexibility, and adhesion properties to a base, produced by application as a simple production method; and an antistatic film, an optical filter, and an optical information recording medium, all having excellent antistatic properties.

The conductive composition of the present invention comprises a π conjugated conductive polymer, a dopant, and a nitrogen-containing aromatic cyclic compound In the conductive composition of the present invention, the dopant may be an organic sulfonic acid.

The organic sulfonic acid may be a sulfo group-containing solubilizing polymer.

In the conductive composition of the present invention, the nitrogen-containing aromatic cyclic compound may be a cation of a nitrogen-containing aromatic cyclic compound having a substituent bonded to the nitrogen atom.

In the conductive composition of the present invention, the nitrogen-containing aromatic cyclic compound may be substituted or un-substituted imidazoles.

Alternatively, the nitrogen-containing aromatic cyclic compound may be substituted or un-substituted pyridines.

The capacitor of the present invention comprises an anode composed of a porous material of valve metal, a dielectric layer formed by oxidizing a surface of the anode, and a cathode provided on the dielectric layer and comprising a solid electrolyte layer containing a π conjugated conductive polymer, which comprises an electron donor compound layer containing an electron donor element provided between the dielectric layer and the cathode.

In the capacitor of the present invention, the electron donor element of the electron donor compound layer may be at least one element selected from the group consisting of nitrogen, oxygen, sulfur, and phosphorus.

The electron donor compound of the electron donor compound layer may be at least one compound selected from the group consisting of pyrroles, thiophenes, and furans.

The electron donor compound of the electron donor compound layer may be amines.

The method of producing a capacitor of the present invention, comprises the steps of: a first step of oxidizing a surface of an anode composed of a porous material of valve metal and forming a dielectric layer; a second step of applying an electron donor compound containing an electron donor element to a surface of the dielectric layer and forming an electron donor compound layer; and a third step of forming a solid electrolyte layer containing a π conjugated conductive polymer on a surface of the electron donor compound layer.

In the method of producing a capacitor of the present invention, the third step may comprise a step of applying a conductive polymer solution containing a π conjugated conductive polymer to the surface of the electron donor compound layer.

Another capacitor of the present invention comprises an anode composed of a porous material of valve metal, a dielectric layer formed by oxidizing a surface of the anode, and a cathode provided on the dielectric layer, wherein the cathode comprises a solid electrolyte layer containing a π conjugated conductive polymer, a dopant, and a nitrogen-containing aromatic cyclic compound.

In the capacitor of the present invention, the cathode may further comprise an electrolytic solution.

The dopant may be a solubilizing polymer containing an anion group.

The nitrogen-containing aromatic cyclic compound may be substituted or un-substituted imidazoles, or substituted or un-substituted pyridines.

The nitrogen-containing aromatic cyclic compound in the solid electrolyte layer of the cathode may be cross-linked.

Another method of producing a capacitor of the present invention, comprising a step of applying a conductive polymer solution containing a π conjugated conductive polymer, a dopant, a nitrogen-containing aromatic cyclic compound, and a solvent to a surface of a dielectric layer of a capacitor intermediate comprising an anode composed of a porous material of valve metal and the dielectric layer formed by oxidizing a surface of the anode, and forming a coating.

In the method of producing a capacitor of the present invention, the nitrogen-containing aromatic cyclic compound in the conductive polymer solution comprises a cross-linkable functional group.

In the above case, the conductive polymer solution may further comprise a cross-linkable compound.

When the nitrogen-containing aromatic cyclic compound comprises a cross-linkable functional group, the method may comprise a step of heating or irradiation with ultraviolet ray the coating after the step of applying the conductive polymer solution and forming the coating.

The antistatic coating material of the present invention comprises a π conjugated conductive polymer, a solubilizing polymer containing an anion group and/or an electron attractive group, a nitrogen-containing aromatic cyclic compound, and a solvent.

The antistatic coating material of the present invention may further comprise a dopant.

The antistatic coating material of the present invention may further comprise a binder resin.

When the antistatic coating material of the present invention comprises a binder resin, the binder resin may be at least one selected from the group consisting of polyurethane, polyester, acrylic resin, polyamide, polyimide, epoxy resin, and polyimide silicone.

The antistatic coating of the present invention is formed by applying the afore-mentioned antistatic coating material.

The antistatic film of the present invention comprises a base film and the aforementioned antistatic coating provided on at least one surface of the base film.

The optical filter of the present invention comprises the aforementioned antistatic coating.

The optical information recording medium of the present invention comprises the aforementioned antistatic coating.

The conductive composition of the present invention has highly conductivity (electric conductivity) and has excellent heat resistance and moisture resistance.

When the dopant is an organic sulfonic acid, particularly, sulfo group-containing solubilizing polymer, dispersibility in and compatibility with a binder resin are increased.

When the nitrogen-containing aromatic cyclic compound is a cation of a nitrogen-containing aromatic cyclic compound that is formed by bonding a substituent to the nitrogen atom, it is more easily bonded or coordinated to a dopant.

When the nitrogen-containing aromatic cyclic compound is substituted or un-substituted imidazoles or substituted or un-substituted pyridines, excellent solvent solubility is exhibited.

It is preferred in the conductive compound that the nitrogen-containing aromatic cyclic compound has a cross-linkable functional group.

In the above case, it is preferred that the conductive composition of the present invention further contains a cross-linkable compound.

The conductive cross-linked product of the present invention is formed by heating and/or irradiating with ultraviolet ray a conductive composition containing a nitrogen-containing aromatic cyclic compound having a cross-linkable functional group.

In the capacitor of the present invention, the cathode has high conductivity and equivalent series resistance is low.

When the cathode comprises an electrolyte solution in the capacitor of the present invention, the electrostatic capacity is efficiently derived.

When the dopant is an anion group-containing solubilizing polymer, the π conjugated conductive polymer can be high solvent solubility.

When the nitrogen-containing aromatic cyclic compound is substituted or un-substituted imidazoles or substituted or un-substituted pyridines, the π conjugated conductive polymer can be high solvent solubility.

According to the method of producing a capacitor of the present invention, a capacitor comprising a cathode having high conductivity and low equivalent series resistance is produced in a simple manner.

The antistatic coating material of the present invention forms an antistatic coating having highly conductivity, flexibility, and adhesion properties to a base by simple application. Since this antistatic coating material realizes sufficient antistatic properties in small amounts, the antistatic coating can be produced at low cost.

When the antistatic coating material of the present invention further comprises a dopant, conductivity and heat resistance of an antistatic coating can be improved.

When the antistatic coating material of the present invention further comprises a binder resin, adhesion properties of the antistatic coating can be improved.

Particularly, when the binder resin is at least one selected from the group consisting of polyurethane, polyester, acrylic resin, polyamide, polyimide, epoxy resin, and polyimide silicone, it is easily mixed with the essential components of the antistatic coating material.

The antistatic coating of the present invention has highly conductivity, flexibility, and adhesion properties to a base, and is produced by application as a simple production method The antistatic film, optical filter, and optical information recording medium of the present invention have excellent antistatic properties, and static electricity cannot occur in them.

Figure 1:
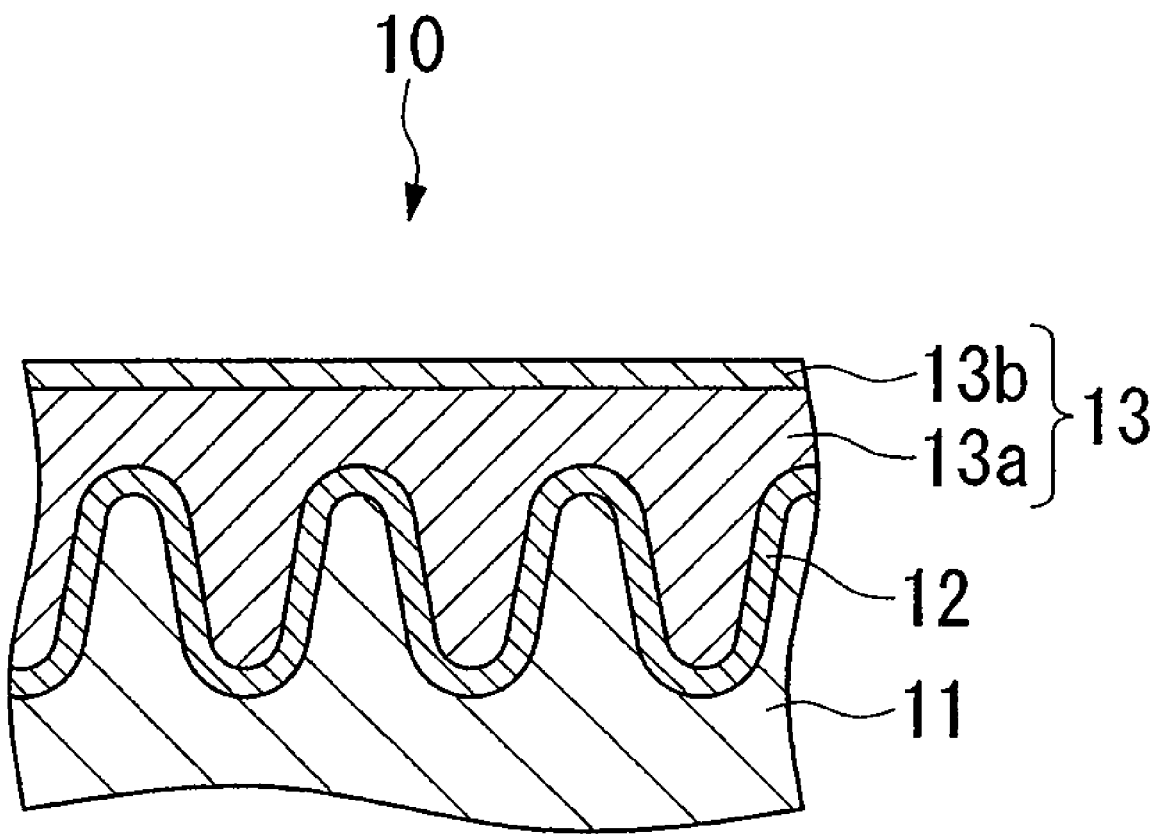
FIG. 1 is a cross-sectional view showing an embodiment of the capacitor according to the present invention.

DETAILED DESCRIPTION OF THE INVENTION (π Conjugated Conductive Polymer)

The π conjugated conductive polymer of the present invention can be any organic polymer having the main chain consisting of a π conjugated system. Examples of the polymer include polypyrroles, polythiophenes, polyacetylenes, polyphenylenes, polyphenylenevinylenes, polyanilines, polyacenes, polythiophenevinylenes, and copolymers thereof. Polypyrroles, polythiophenes, and polyanilines are preferred in view of stability in the air.

The π conjugated conductive polymer may have sufficient conductivity and compatibility with a binder resin, even if the polymer is un-substituted. However, it is preferable to introduce a functional group such as alkyl, carboxy, sulfo, alkoxy, and hydroxy groups in the π conjugated conductive polymer for improved conductibility and compatibility.

Examples of the π conjugated conductive polymer specifically include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(hexyloxythiophene), poly(3-heptyloxythiophene), poly(3-octyloxythiophene), poly(3-decyloxythiophene), poly(3-dodecyloxythiophene), poly(3-octadecyloxythiophene), poly(3-methyl-4-methoxythiophene), poly(3,4-ethylenedioxythiophene), poly(3-methy-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

Among these, a (co)polymer composed of one or two compounds selected from polypyrrole, polythiophene, poly(N-methylpyrrole), poly(3-methylthiophene), poly(3-methoxythiophene), and poly(3,4-ethylenedioxythiophene) are preferably used in view of small resistance value and high reactivity. Furthermore, polypyrrole and poly(3,4-ethylenedioxythiophene) are more preferred because they have high conductivity and improve heat resistance.

The π conjugated conductive polymer comprising an alkyl group having a carbon number of 6 or larger in the substituent is preferred because it gives solvent solubility without using anion group-containing solubilizing polymers described later. The π conjugated conductive polymer containing an anion group as a substituent in the molecule is preferred because the polymer itself is water-soluble.

The aforementioned π conjugated conductive polymer can be easily obtained by chemical oxidative polymerizing precursor monomers of a π conjugated conductive polymer in a solvent in the presence of oxidant or oxidation polymerization catalysis.

Pyrroles and their derivatives, thiophenes and their derivatives, and anilines and their derivatives can be used as precursor monomers of a π conjugated conductive polymer.

Any oxidant can be used as long as it oxidizes the precursor monomers to obtain a π conjugated conductive polymer. Examples of the oxidant include peroxodisulfate such as ammonium peroxodisulfate, sodium peroxodisulfate, and potassium peroxodisulfate; transition metal compounds such as iron (II) chloride, iron (II) sulfate, iron (II) nitride, and copper (II) chloride; metal halogen compounds such as boron trifluoride and aluminum chloride; metal oxides such as silver oxide and cesium oxide; peroxides such as hydrogen peroxide and ozone; organic peroxides such as benzoyl peroxide; and oxygen.

The solvent for chemical oxidative polymerization is not limited. Any solvent can be used as long as it dissolves or disperses the precursor monomers and maintains the oxidation ability of oxidant and oxidation catalysis. Examples of the solvent include polar solvents such as water, N-methyl-2-pyrrolidone, N,N-dimethylformamide, N,N-dimethylacetamide, dimethylsulfoxide, hexamethylenephosphortriamide, acetonitrile, and benzonitrile; phenols such as cresol, phenol, and xylenol; alcohols such as methanol, ethanol, propanol and butanol; ketones such as acetone and methylethylketone; hydrocarbons such as hexane, benzene, and toluene; carboxylic acid such as formic acid and acetic acid; carbonate compounds such as ethylene carbonate and propylene carbonate; ether compounds such as dioxane and diethylether; chain ethers such as ethylene glycol dialkylether, propylene glycol dialkylether, polyethylene glycol dialkylether, and polypropylene glycol dialkylether; heterocyclic compounds such as 3-methyl-2-oxazolidinone; and nitrile compounds such as acetonitrile, glutarodinitrile, methoxyacetonitrile, propionitrile, and benzonitrile. These solvents can be used individually or in combination of two or more, or mixed with other organic solvents.

(Dopant)

Any dopant may be used as long as it can change the oxidation-reduction potential of a conjugate electron in the π conjugated conductive polymer while the π conjugated conductive polymer is doped/undoped. The dopant may be a donor or an acceptor.

[Donor Dopant]

Examples of the donor dopant include alkaline metals such as sodium and potassium; alkaline-earth metals such as calcium and magnesium; and quaternary amine compounds such as tetramethylammonium, tetraethylammonium, tertapropylammonium, tetrabutylammonium, methyltriethylammonium, and dimethyldiethylammonium.

[Acceptor Dopant]

Examples of the acceptor dopant include halogen compounds, Lewis acids, protonic acids, organic cyano compounds, and organic metal compounds.

Examples of halogen compounds include chlorine (Cl2), bromine (Br2), Iodine (I2), iodine chloride (ICl), iodine bromide (IBr), and iodine fluoride (IF).

Examples of Lewis acids include PF5, AsF5, SbF5, BF5, BCl5, BBr5, and SO3.

Examples of organic cyano compounds include compounds containing two or more cyano groups in the conjugated bond such as tetracyanoethylene, tetracyanoethyleneoxide, tetracyanobenzene, dichlorodicyanobenzoquinone (DDQ), tetracyanoquinodimethane, and tetracyanoazanaphthalene.

The protonic acid includes inorganic and organic acids. Examples of inorganic acids include hydrochloric acid, sulfuric acid, nitric acid, phosphoric acid, borohydrofluoric acid, hydrofluoric acid, and perchloric acid. Examples of organic acids include organic carboxylic acid, phenols, and organic sulfonic acid.

The organic carboxylic acid may be those having one or more carboxy groups in the aliphatic, aromatic, or cyclic aliphatic series. Examples of organic carboxylic acid include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid, and triphenylacetic acid.

The organic sulfonic acid may be those having one or more sulfo groups in the aliphatic, aromatic, or cyclic aliphatic series. Examples of those having a sulfo group include methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethanesulfonic acid, 3-chloro-2-hydroxypropanesulfonic acid, trifluoromethanesulfonic acid, colistinmethanesulfonic acid, 2-acrylamide-2-methylpropanesulfonic acid, aminomethanesulfonic acid, 1-amino-2-naphthol-4-sulfonic acid, 2-amino-5-naphthol-7-sulfonic acid, 3-aminopropanesulfonic acid, N-cyclohexyl-3-aminopropanesulfonic acid, benzenesulfonic acid, p-toluenesulfonic acid, xylenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, hexadecylbenzenesulfonic acid, 2,4-dimethylbenzenesulfonic acid, dipropylbenzenesulfonic acid, butylbenzensulfonic acid, 4-aminobenzenesulfonic acid, o-aminobenzenesulfonic acid, m-aminobenzenesulfonic acid, 4-amino-2-chrolotoluene-5-sulfonic acid, 4-amino-3-methylbenzen-1-sulfonic acid, 4-amino-5-methoxy-2-methylbenzenesulfonic acid, 2-amino-5-methylbenzene-1-sulfonic acid, 5-amino-2-methylbenzene-1-sulfonic acid, 4-amino-3-methylbenzene-1-sulfonic acid, 4-acetamido-3-chlorobenzenesulfonic acid, 4-chrolo-3-nitrobenzensulfonic acid, p-chlorobenzenesulfonic acid, naphthalenesulfonic acid, methylnaphthalenesulfonic acid, propylnaphthalenesulfonic acid, butylnaphthalenesulfonic acid, pentylnaphtalenesulfonic acid, dimethylmaphthalenesulfonic acid, 4-amino-1-naphthalenesulfonic acid, 8-chloronaphthalene-1-sulfonic acid, and sulfonic acid compounds containing a sulfo group such as naphthalenesulfonic acid formamide condensation polymer and melamine sulfonic acid formamide condensation polymer.

Examples of those having two sulfo groups include ethanedisulfonic acid, butanedisulfonic acid, pentanedecandisulfonic acid, decandisulfonic acid, m-benzenedisulfonic acid, o-benzenedisulfonic acid, p-benzenedisulfonic acid, toluenedisulfonic acid, xylenedisulfonic acid, chlorobenzenedisulfonic acid, fluorobenzenedisulfonic acid, aniline-2,4-disulfonic acid, aniline-2,5-disulfonic acid, dimethylbenzenedisulfonic acid, diethylbenzenedisulfonic acid, dibutylbenzenedisulfonic acid, naphthalenedisulfonic acid, methylnaphthalenedisulfonic acid, ethylnaphthalenedisulfonic acid, dodecylnahthalenedisulfonic acid, pentadecylnaphthalenedisulfonic acid, butylnaphthalenedisulfonic acid, 2-amino-1,4-benzenedisulfonic acid, 1-amino-3,8-naphthalenedisulfonic acid, 3-amino-1,5-naphthalenedisulfonic acid, 8-amino-1-naphthol-3,6-disulfonic acid, 4-amino-5-naphthol-2.7-disulfonic acid, anthracenedisulfonic acid, butylanthracenedisulfonic acid, 4-acetamido-4'-isothio-cyanatostylbene-2,2'-disulfonic acid, 4-acetamido-4'-isothiocyanatostylbene-2,2'-disulfonic acid, 4-acetamido-4'-maleimidylstylbene-2,2'-disulfonic acid, 1-acetoxypylene-3,6,8-trisulfonic acid, 7-amino-1,3,6-naphthalenetrisulfonic acid, 8-aminonaphthalene-1,3,6-trisulfonic acid, and 3-amino-1,5,7-naphthalenetrisulfonic acid.

Among the organic acids, solubilizing polymers containing anion groups (hereinafter, referred to anion group-containing solubilizing polymer) are preferred. The anion group-containing solubilizing polymer is preferably used because it does not only function as a dopant but also satisfactory solubilizes a π conjugated conductive polymer in a solvent, which makes the polymer usable as a coating material.

The anion group-containing solubilizing polymer may be, for example, substituted or un-substituted polyalkylenes, substituted or un-substituted polyalkenylenes, substituted or un-substituted polyimides, substituted or un-substituted polyamides, and substituted or un-substituted polyesters. Some of these are polymers comprising anion group-containing units only and the others are polymers comprising anion group-containing units and no anion group-containing units.

Polyalkylene is a polymer repeatedly containing methylene in the main chain.

Polyalkenylene can be a polymer having the main chain comprising units each containing one vinyl group. Particularly, substituted or un-substituted butenylenes are preferred because of the interaction between the unsaturated bond and a π conjugated conductive polymer and easy synthesis using substituted or un-substituted butadienes as a starting material.

Examples of polyimides include those from acid anhydrides such as pyromellitic dianhydride, biphenyl tetracarboxylic dianhydride, benzophenonetetracarboxylic dianhydride, 2,2,3,3-tetracarboxydiphenylether dianhydride, and 2,2-[4,4'-di(dicarboxyphenyloxy)phenyl]propane dianhydride; and diamines such as oxydianiline, paraphenylenediamine, metaphenylenediamine, and benzophenonediamine.

Examples of polyamides include polyamide 6, polyamide 6,6, and polyamide 6,10.

Examples of the polyesters include polyethylene terephthalate and polybutylene terephthalate.

When the aforementioned polymers have substituent, specific examples of the substituents are alkyl, hydroxy, carboxy, cyano, phenyl, phenol, ester, alkoxy, and carbonyl group.

The alkyl group improves solubility and dispersibility into polar or non-polar solvents and compatibility with and dispersibility in resins. The hydroxy group facilitates the hydrogen bond to other hydrogen atoms, improving solubility in organic solvents and compatibility with, dispersibility in, and adhesion property to resins. The cyano and hydroxyphenyl groups improve compatibility with and solubility in polar resins. They also improve heat resistance. Among them, alkyl, hydroxy, ester, and cyano groups are preferable.

Example of the alkyl group include alkyl groups such as methyl, ethyl, propyl, butyl, isobutyl, t-butyl, pentyl, hexyl, octyl, decyl, and dodecyl and cycloalkyl groups such as cyclopropyl, cyclopentyl, and cyclohexyl. Alkyl groups having a carbon number between 1 and 12 are preferable in view of solubility in organic solvents, dispersibility in resins, and steric hindrance.

The hydroxyl group can be, for example, a hydroxy group directly bonded to the main chain of an anion group-containing solubilizing polymer, a hydroxyl group bonded to the end of an alkyl group having a carbon number between 1 and 7 bonded to the main chain of an anion group-containing solubilizing polymer, or a hydroxyl group bonded to the end of an alkenyl group having a carbon number between 2 and 7 bonded to the main chain of an anion group-containing solubilizing polymer. Among them, a hydroxyl group bonded to the end of an alkyl group having a carbon number between 1 and 6 bonded to the main chain is preferable in view of compatibility with resins and solubility in solvents.

The ester group can be, for example, an alkyl ester or aromatic ester groups directly bonded to the main chain of an anion group-containing solubilizing polymer or an alkyl ester or aromatic ester group bonded thereto via another functional group.

The cyano group can be, for example, a cyano group directly bonded to the main chain of an anion group-containing solubilizing polymer, a cyano group bonded to the end of an alkyl group having a carbon number between 1 and 7 bonded to the main chain of an anion group-containing solubilizing polymer, or a cyano group bonded to the end of an alkenyl group having a carbon number between 2 and 7 bonded to the main chain of an anion group-containing solubilizing polymer.

Any anion group can be contained in the anion group-containing solubilizing polymer, and among them, monosubstituted sulfuric acid ester, monosubstituted phosphoric acid ester, carboxy, and sulfo groups are preferable in view of easy production and stability. Sulfo group is further preferable in view of doping effect of functional groups on the π conjugated conductive polymer. In other words, sulfo group-containing solubilizing polymers are further preferable anion group-containing solubilizing polymers.

The sulfo group-containing solubilizing polymer has a sulfo group in a polymer side chain. The main chain of a solubilizing polymer can be, for example, polyalkylene repeatedly comprising methylene or a polyalkenylene consisting of units each containing a vinyl group in the main chain. The sulfo group can be introduced by direct sulfonation/sulfation using fuming sulfuric acid, sulfonation using a sulfonating agent, sulfonation through sulfonic group transposition, and polymerization of sulfo group-containing polymerizable monomers.

In the polymerization of sulfo group-containing polymerizable monomers, sulfo group-containing polymerizable monomers and, if necessary, other no sulfo group-containing polymerizable monomers are polymerized by chemical oxidative polymerization in the presence of oxidant and/or oxidative polymerization catalysis.

Any sulfo group-containing polymerizable monomers can be used as long as they have sulfo-substituents at appropriate positions. Examples of such monomers include substituted or un-substituted ethylene sulfonic acid compounds, substituted or un-substituted styrenesulfonic acid compounds, substituted heterocyclicsulfonic acid compounds, substituted acrylamide sulfonic acid compounds, substituted or un-substituted cyclovinylenesulfonic acid compounds, substituted or un-substituted butadienesulfonic acid compounds, and vinylaromaticsulfonic acid compounds.

Examples of substituted or un-substituted ethylenesulfonic acid compounds include vinylsulfonic acid, vinylsulfonate, allylsulfonic acid, allylsulfonate, methallylsulfonic acid, methallylsulfonate, sulfoethylmethacrylate, sulfoethylmethacrylate, 4-sulfobutylmethacrylate, 4-sulfobutylmethacrylate salt, methallyloxybenzenesulfonic acid, methallyloxybenzenesulfonate salt, allyloxybenzenesulfonic acid, and allyloxybenzenesulfonate salt.

Examples of the substituted or un-substituted styrenesulfonic acid compounds include styrenesulfonic acid, styrenesulfonate, a-methylstyresufonic acid, and α-methylstyrenesulfonate.

Examples of the substituted acrylamidosulfonic acid compounds include acrylamide-t-butyl sulfonic acid, acrylamide-t-butylsulfonate, 2-acrylamide-2-methylpropanesulfonic acid, and 2-acrylamide-2-methylpropanesulfonate.

Examples of the substituted or un-substituted cyclovinylenesulfonic acid compounds include cyclobutene-3-sulfonic acid and cyclobutene-3-sulfonate.

Examples of the substituted or un-substituted butadienesulfonic acid compounds include isoprenesulfonic acid, isoprenesulfonate, 1,3-butadiene-1-sulfonic acid, 1,3-butadiene-1-sulfonate, 1-methyl-1,3-butadiene-2-sulfonic acid, 1-methyl-1,3-butadiene-3-sulfonate, 1-mehyl-1,3-butadiene-4-sulfonic acid, and 1-methyl-1,3-butadiene-4-sulufonate.

Among them, vinylsulfonic acid, sulfoethyl methacrylate, sulfoethyl methacrylate salt, 4-sulfobutylmethacrylate, 4-sulfobutylmethacrylate salt, styrenesulfonic acid, styrene sulfonate, isoprene sulfonic acid, and isoprene sulfonate are preferable.

The other no sulfo group-containing polymerizable monomers can be substituted or un-substituted ethylene compounds, substituted acrylic acid compounds, substituted or un-substituted styrenes, substituted or un-substituted vinylamines, unsaturated group-containing heterocyclic compounds, substituted or un-substituted acrylamide compounds, substituted or un-substituted cyclovinylene compounds, substituted or un-substituted butadiene compounds, substituted or un-substituted vinylaromatic compounds, substituted or un-substituted divinylbenzene compounds, substituted vinylphenol compounds, any substituted silylstyrene, and any substituted phenol compounds.

Their examples specifically include ethylene, propene, 1-buten, 2-buten, 1-pentene, 2-pentene, 1-hexene, 2-hexene, styrene, p-methylstyrene, p-ethylstyrene, p-butylstyrene, 2,4,6-trimethylstyrene, p-methoxystyrene, 2-vinylnaphthalene, 6-methyl-2-vinylnaphthalene, 1-vinylimidazole, vinylpyridine, vinylacetate, acrylaldehyde, acrylonitrile, N-vinyl-2-pyrrolidone, acrylamide, N,N-dimethylacrylamide, methyl acrylate, ethyl acrylate, propyl acrylate, butyl acrylate, isobutyl acrylate, isooctyl acrylate, isononylbutyl acrylate, allyl acrylate, ethyl metacrylate, hydroxyethyl acrylate, methoxyethyl acrylate, methoxybutyl acrylate, stearyl acrylate, acrylic acid ester, acryloylmorpholine, vinylamine, N,N-dimethylvinylamine, N,N-diethylvinylamine, N,N-dibutylvinylamine, N,N-t-butylvinylamine, N,N-diphenylvinylamine, N-vinylcarbazole, vinyl alcohol, vinyl chloride, vinyl fluoride, vinyl ether, cyclopropene, cyclobutene, cyclopentene, cyclohexsane, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, 2-hydroxy-1,3-butadiene, allyl acrylate, acrylamideallyl, divinyl ether, o-divinylbenzene, m-divinylbenzene, and p-divinylbenzene. Among them, preferred examples include 1-butene, vinylphenol, butyl acrylate, N-vinyl-2-pirrolidone, and 1,3-butadiene.

The same oxidant, oxidation catalysis, and solvent can be used in the polymerization of anion group-containing polymerizable monomers as in the polymerization of precursor monomers for constituting a π conjugated conductive polymer.

Examples of the anion group-containing solubilizing polymer include polyvinylsulfonic acid, polystyrenesulfonic acid, polyallylsulfonic acid, ethyl polyacrylatesulfonic acid, butyl polyacrylatesulfonic acid, polyacrylsulfonic acid, polymethacrylsulfonic acid, poly-2-acrylamide-2-methylpropanesulfonic acid, polyisoprenesulfonic acid, polystyrene carboxylic acid, poly-2-acrylamide-2-methylpropane carboxylic acid, polyisoprenecarboxylic acid, and polyacrylic acid. They can be used as individually or in combination of two or more.

The dopant can be preferably used in the conductive composition in an amount of 0.1 to 10 mol, more preferably 0.5 to 7 mol, to 1 mol of a π conjugated conductive polymer. When the dopant content is less than 0.1 mol, the doping effect of the dopant on the π conjugated conductive polymer tends to be reduced, resulting in insufficient conductivity. When the dopant content is more than 10 mol, the conductive composition contains a smaller amount of π conjugated conductive polymer, resulting in insufficient conductivity.

The solubilizing polymer in the antistatic coating material has an anion group and/or an electron attractive group in the molecules and solubilizes the π conjugated conductive polymer in a solvent. The solubilizing polymer also functions as a dopant.

The solubilizing polymer containing an anion group in the molecules is as mentioned above.

The solubilizing polymer containing an electron attractive group in the molecules (hereinafter, referred to the electron attractive group-containing solubilizing polymer) can be a polymer comprising as a unit at least one compound selected from cyano, nitro, formyl, carbonyl, and acetyl groups.

Examples of the electron attractive group-containing solubilizing polymer include polyacrylonitrile, polymethacrylonitrile, acrylonitrile-sryrene resin, acrylonitrile-butadiene resin, acrylonitrile-butadiene-styrene resin, resin obtained by cyanoethylating hydroxyl- or amino-containing resin, polyvinylpyrrolidone, alkylated polyvinylpyrrolidone, and nitrocellulose.

Among these, acrylonitrile and methacrylonitrile having a cyano-containing compound as a unit are preferred. The cyano group is a highly polar group and, therefore, improves compatibility with and dispersibility in binder resin components.

Solubilizing polymer can be a copolymer such as a copolymer of two or more of the aforementioned anion group-containing solubilizing polymer and electron attractive group-containing solubilizing polymer, a copolymer comprising units having different anion groups, and a copolymer comprising units having different electron attractive groups.

Solubilizing polymer further can be a polymer copolymerized with other vinyl compounds such as halogenated vinyl compounds, aromatic vinyl and/or their derivatives, heterocyclic vinyl compounds and/or their derivatives, aliphatic vinyl compounds and/or their derivatives, acryl compounds, diene compounds, and maleimide compounds.

Examples of the vinyl compounds include polymerizable vinyl compounds such as styrene, butadiene, acrylic acid, methacrylic acid, hydroxylacrylic acid, hydroxymethacrylic acid, acrylic acid ester, methacrylic acid ester, and p-vinyltoluene. The copolymerization with these other vinyl compounds serves to control solvent-solubility and compatibility with binder resins.

The solubilizing polymer can contain synthetic rubber components for modifying impact resistance, antiaging agents for improving environment resistance, antioxidant, and UV absorbents. Amine compounds as antioxidant may inhibit the action of the oxidant for polymerizing the aforementioned conductive polymer. Therefore, phenol compounds may be used as antioxidant or the antioxidant is mixed after the polymerization.

(Nitrogen-Containing Aromatic Cyclic Compound)

The nitrogen-containing aromatic cyclic compound has an aromatic ring having at least one or more nitrogen atoms wherein the nitrogen atoms in the aromatic ring are conjugated to other atoms in the aromatic ring. To be conjugated, the nitrogen and other atoms have an unsaturated bond or the nitrogen atoms are adjacent to other atoms having an unsaturated bond when the nitrogen and other atoms themselves do not have an unsaturated bond. An unshared electrons pair on the nitrogen atoms can form a pseudo-conjugation to the unsaturated bond formed between other atoms.

It is preferred that the nitrogen-containing aromatic cyclic compound be provided with both the nitrogen atom conjugated to another atom and the nitrogen atom adjacent to another atom having an unsaturated bond.

The nitrogen-containing aromatic cyclic compound can be, for example, pyridine having a nitrogen atom and their derivatives, imidazoles having two nitrogen atoms and their derivatives, pyrimidines and their derivatives, pyrazines and their derivatives, and triazines having three nitrogen atoms and their derivatives. Pyridines and their derivatives, imidazoles and their derivatives, and pyrimidines and their derivatives are preferred from the standpoint of solvent solubility.

The nitrogen-containing aromatic cyclic compound may or may not have a substituent in the ring, such as alkyl, hydroxyl, carboxy, cyano, phenyl, phenol, ester, alkoxy, and carbonyl group. The nitrogen-containing aromatic cyclic compound can be polycyclic.

Examples of the alkyl group as a substituent include alkyl groups such as methyl, ethyl, propyl, butyl, isobutyl, t-butyl, pentyl, hexyl, octyl, decyl, and dodecyl and cycloalkyl groups such as cyclopropyl, cyclopentyl, and cyclohexyl. Among them, alkyl groups having a carbon number between 1 and 12 are preferred in view of solubility in organic solvents, dispersibility in resins, and steric hindrance.

Examples of the hydroxy group include alkylenehydroxy groups such hydroxy, methylenehydroxy, ethylenehydroxy, trimethylenehydroxy, tetramethylenehydroxy, pentamethylenehydroxy, hexamethylenehydroxy, heptamethylenehydroxy, propylenehydroxy, butylenehydroxy, and ethylmethylenehydroxy and alkenylenehydroxy groups such as propenylenehydroxy, butenylenehydroxy, and pentenylenehydroxy.

Examples of the carboxy group include alkylenecarboxy groups such carboxy, methylenecarboxy, ethylenecarboxy, trimethylenecarboxy, propylenecarboxy, tetramethylenecarboxy, pentamethylenecarboxy, hexamethylenecarboxy, heptamethylenecarboxy, ethylmethylenecarboxy, and phenylethylenecarboxy, and alkenylenecarboxy groups such as isoprenecarboxy, propenylenecarboxy, butenylenecarboxy, and pentenylenecarboxy.

Examples of the cyano group include alkylenecyano groups such cyano, methylenecyano, ethylenecyano, trimethylenecyano, tetramethylenecyano, pentamethylenecyano, hexamethylenecyano, heptamethylenecyano, propylenecyano, butylenecyano, and ethylmethylenecyano; and alkenylenecyano groups such as propenylenecyano, butenylenecyano, and pentenylenecyano.

Examples of the phenol group include alkylphenol groups such phenol, methylphenol, ethylphenol, and butylphenol; and alkylenephenol groups such methylenephenol, ethylenephenol, trimethylenephenol, tetramethylenephenol, pentamethylenephenol, and hexamethylenephenol Examples of the phenyl group include alkylphenyl groups such phenyl, methylphenyl, butylphenyl, octylphenyl, and dimethylphenyl; alkylenephenyl groups such methylenephenyl, ethylenephenyl, trimethylenephenyl, tetramethylenephenyl, pentamethylenephenyl, hexamethylenephenyl, and heptamethylenephenyl; and alkenylenephenyl groups such as propenylphenyl, butenylenephenyl, and pentenylenephenyl.

Examples of the alkoxy group include methoxy, ethoxy, butoxy, and phenoxy.

Examples of the pyridines and their derivatives include pyridine, 2-methylpyridine, 3-methylpyridine, 4-methylpyridine, 4-ethylpyridine, 2,4-dimethylpyridine, 2,4,6-trimethylpyridine, 3-cyano-5-methylpyridine, 2-pyridine carboxylic acid, 6-methyl-2-pyridine carboxylic acid, 2,6-pyridine-dixarboxylic acid, 4-pyridinecarboxyaldehyde, 4-aminopyridine, 2,3-diaminopyridine, 2,6-diaminopyridine, 2,6-diamino-4-methylpyridine, 4-hydoxypyridine, 2,6-dihydroxypyridine, 6-hydroxy methyl nicotinate, 2-hydroxy-5-pyridinemethanol, 6-hydroxy ethyl nicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxyaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, and 3-pyridinesulfonic acid.

Examples of the imidazoles and their derivatives include imidazole, 2-methylimidazole, 2-propylimidazole, 2-undecylimidazole, 2-phenylimidazole, N-methylimidazole, 1-(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, 4,5-imidazoledimethyldicarboxylate, benzimidazole, 2-aminobenzimidazole, 2-aminobenzimidazole-2-sulfonic acid, 2-amino-1-methylbenzimidazole, 2-hydroxybenzimidazole, and 2-(2-pyridyl)benzimidazole.

Examples of the pyrimidines and their derivatives include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol.

Examples of the pyrazines and their derivatives include pyrazine, 2-methylpyrazine, 2,5-dimethylpyrazine, pyrazinecarboxylic acid, 2,3-pyrazinedicarboxylic acid, 5-methylpyrazine carboxylic acid, pyrazineamide, 5-methylpyrazineamide, 2-cyanopyrazine, aminopyrazine, 3-aminopyrazine-2-carboxylic acid, 2-ethyl-3-methylpyrazine, 2-ethyl-3-methylpyrazine, 2,3-dimethylpyrazine, and 2,3-dimethylpyrazine.

Examples of the triazines and their derivatives include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluolomethyl)-1,3,5-triazine, 2,4,6-tri-2-pyridine-1,3,5-triazine, 3-(2-pyridine)-5,6-bis(4-phenylsullfonic acid)-1,2,4-triazinedisodium, 3-(2-pyridine)-5,6-diphenyl-1,2,4-triazine, 3-(2-pyridine)-5,6-diphenyl-1,2,4-triazine-p,p'-disodiumdisulfonate, and 2-hydroxy-4,6-dichloro-1,3,5-triazine.

The nitrogen atom of the nitrogen-containing aromatic cyclic compound has an unshared electron pair. Therefore, a substituent or a proton coordinates or bind to the nitrogen atom. When a substituent or a proton easily coordinates or binds to the nitrogen atom, the nitrogen atom tends to be positively charged. Because the nitrogen and another atom are conjugated, the positive charge produced by the constituent or proton coordinated or bound to the nitrogen atom is dispersed and stably present in the nitrogen-containing aromatic ring.

Therefore, the nitrogen-containing aromatic cyclic compound can be a cation of a nitrogen-containing aromatic cyclic compound with a substituent introduced in the nitrogen atom. Further, the cation and an anion can be combined to form a salt. The nitrogen-containing aromatic cyclic compound in the form of a salt has the same effect as the noncation form of the nitrogen-containing aromatic cyclic compound.

The substituent that can be introduced in the nitrogen atom of the nitrogen-containing aromatic cyclic compound can be hydrogen or alkyl, hydroxyl, carboxy, cyano, phenyl, phenol, ester, alkoxy, or carbonyl group.

Examples of the alkyl group include alkyl groups such as methyl, ethyl, propyl, butyl, isobutyl, t-butyl, pentyl, hexyl, octyl, decyl, and dodecyl; and cycloalkyl groups such as cyclopropyl, cyclopentyl, and cyclohexyl. Among them, alkyl groups having a carbon number between 1 and 12 are preferred in view of solubility in organic solvents, dispersibility in resins, and steric hindrance.

Examples of the hydroxy group include hydroxy, alkylenehydroxy groups such as methylenehydroxy, ethylenehydroxy, trimethylenehydroxy, tetramethylenehydroxy, pentamethylenehydroxy, hexamethylenehydroxy, heptamethylenehydroxy, propylenehydroxy, butylenehydroxy, and ethylmethylenehydroxy; and alkenylenehydroxy groups such as propenylenehydroxy, butenylenehydroxy, and pentenylenehydroxy.

Examples of the carboxy group include carboxy, alkylenecarboxy groups such methylenecarboxy, ethylenecarboxy, trimethylenecarboxy, propylenecarboxy, tetramethylenecarboxy, pentamethylenecarboxy, hexamethylenecarboxy, heptamethylenecarboxy, ethylmethylenecarboxy, and phenylethylenecarboxy; and alkenylenecarboxy groups such as isoprenecarboxy, propenylenecarboxy, butenylenecarboxy, and pentenylenecarboxy.

Examples of the cyano group include cyano, alkylenecyano groups such as methylenecyano, ethylenecyano, trimethylenecyano, tetramethylenecyano, pentamethylenecyano, hexamethylenecyano, heptamethylenecyano, propylenecyano, butylenecyano, and ethylmethylenecyano; and alkenylenecyano groups such as propenylenecyano, butenylenecyano, and pentenylenecyano.

Examples of the phenol group include phenol, alkylphenol groups such as methylphenol, ethylphenol, and butylphenol; and alkylenephenol groups such methylenephenol, ethylenephenol, trimethylenephenol, tetramethylenephenol, pentamethylenephenol, and hexamethylenephenol Examples of the phenyl group include phenyl, alkylphenyl groups such as methylphenyl, butylphenyl, octylphenyl, and dimethylphenyl; alkylenephenyl groups such methylenephenyl, ethylenephenyl, trimethylenephenyl, tetramethylenephenyl, pentamethylenephenyl, hexamethylenephenyl, heptamethylenephenyl; and alkenylenephenyl groups such as propenylphenyl, butenylenephenyl, and pentenylenephenyl.

Examples of the alkoxy group include methoxy, ethoxy, butoxy, and phenoxy.

Examples of anions of that form salts together with a cation of a nitrogen-containing aromatic cyclic compound include halogen, sulfate ion, chlorite, and organic sulfonate ions.

The aforementioned organic sulfonic acids can be used.

For example, in the antistatic coating material, part of the incorporated nitrogen-containing aromatic cyclic compound coordinates or binds to protons or other functional groups from the dopant, being positively charged and becoming a cation of the nitrogen-containing aromatic cyclic compound. Therefore, the incorporated nitrogen-containing aromatic cyclic compound is present in the antistatic coating material as a mixture of a nitrogen-containing aromatic cyclic cation compound and a nitrogen-containing aromatic cyclic compound that does not coordinate or bind. The nitrogen-containing aromatic cyclic cation compound and nitrogen-containing aromatic cyclic compound form salts together with excessive anion groups or electron attractive groups of the dopant, are attracted to the dopant, and penetrate into the molecules of the π conjugated conductive polymer of the antistatic coating material. The presence of the nitrogen-containing aromatic cyclic cation compound and nitrogen-containing aromatic cyclic compound between the molecules of the π conjugated conductive polymer causes the hopping energy for electric conductivity of the π conjugated conductive polymer to drop, and therefore improves the electric conductivity of the antistatic coating material.

The nitrogen-containing aromatic cyclic compound preferably has a cross-linkable functional group for improved conductivity and heat resistance. A nitrogen-containing aromatic cyclic compound having a cross-linkable functional group is hereinafter termed the cross-linkable nitrogen-containing aromatic cyclic compound.

A cross-linkable functional group is a functional group that reacts with and links to a functional group of the same type or of a different type.

The cross-linkable functional group can bind to the nitrogen-containing aromatic cyclic compound directly or via a functional group such as substituted or un-substituted methylene, substituted or un-substituted ethylene, and substituted or un-substituted propylene.

The cross-linkable functional group can be introduced into a nitrogen atom or a carbon atom of the nitrogen-containing aromatic cyclic compound.

The cross-linkable functional group can be, for example, vinyl, carboxy, hydroxy, amino, or ester group. Among them, the vinyl, carboxy, and hydroxy groups are preferred because they are highly reactive and cross-linkable.

Carboxy, hydroxy, amino, and ester groups are the same as the aforementioned.

The cross-linkable nitrogen-containing aromatic cyclic compound can be, for example, a pyridine having a cross-linkable functional group and their derivatives and imidazole having a cross-linkable functional group and their derivatives.

Examples of the pyridines having a cross-linkable functional group and their derivatives include 2-vinylpyridine, 4-vinylpyridine, 2-methyl-6-vinylpyridine, 5-methyl-2-vinylpyridine, 4-butenylpyridine, 4-pentenylpyridine, 2-(4-pyridyl) alcohol, 4-(1-butenylpentenyl)pyridine, 2-pyridine carboxylic acid, 4-pyridine carboxylic acid, 6-methyl-2-pyridine carboxylic acid, 2,3-pyridine dicarboxylic acid, 2,3 pyridine dicarboxylic acid, 2,5-pyridine dicarboxylic acid, 2,6-pyridine dicarboxylic acid, 4-hydroxypyridine, 2,6-dihydroxypyridine, 6-hydroxy methyl nicotinate, 2-hydroxy-5-pyridinemethanol, 6-hydroxy ethyl nicotinate, 4-pyridine methanol, 4-pyridine ethanol, and 2-pyridine carbonitrile.

Examples of the imidazoles having a cross-linkable functional group and their derivatives include N-vinylimidazole, N-allylimidazole, 2-methyl-4-vinylimidazole, 2-methyl-1-vinylimidazole, imidazole-4-carboxylic acid, 4,5-imidazole dicarboxylic acid, 1-(2-hydroxyethyl)imidazole, 2-hydroxymethylimidazole, 4-hydroxymethylimidazole, 2-butyl-4-hydroxymethylimidazole, 2-methyl-4-hydroxymethylimidazole, 4-hydroxymethyl-2-methylimidazole, 1-benzyl-2-hydroxybenzimidazole, methylimidazole-4-catboxylate, ethylimidazole-4-carboxylate, and 4,5-imidazole dimethyl dicarboxylate.

The nitrogen-containing aromatic cyclic compound is preferably used in an amount of 0.1 to 100 mol, more preferably 1 to 30 mol, to 1 mole of dopant and/or solubilizing polymer. The range from 1 to 30 mol is preferred in view of physical properties and conductivity of the coating. When the nitrogen-containing aromatic cyclic compound is used in an amount of less than 0.1 mol, the interaction between the nitrogen-containing aromatic cyclic compound and the dopant and π conjugated conductive polymer tends to decrease, possibly resulting in insufficient conductivity. When the nitrogen-containing aromatic cyclic compound is used in an amount of greater than 100 mol, the content of the π conjugated conductive polymer is excessively low, here again possibly resulting in insufficient conductivity.

(Cross-Linkable Compound)

The cross-linkable nitrogen-containing aromatic cyclic compound contained preferably contains a cross-linkable compound.

The cross-linkable compound is preferably a compound having a vinyl group when the cross-linkable functional group is a vinyl group, and is preferably a compound having a hydroxy or amino group when the cross-linkable functional group is a carboxy group, and is preferably a compound having a carboxy group when the cross-linkable functional group is a hydroxy group.

With the cross-linkable compound being introduced, the cross-linkable functional group of the cross-linkable nitrogen-containing aromatic cyclic compound is easily cross-linked, thereby ensuring stability.

Examples of the cross-linkable compound include methyl acrylate, ethyl acrylate, propyl acrylate, butyl acrylate, isobutyl acrylate, isooctyl acrylate, isononylbutyl acrylate, allyl acrylate, ethyl methacrylate, hydroxyethyl acrylate, methoxyethyl acrylate, methoxybutyl acrylate, stearyl acrylate, acryloylmorpholine, vinyl-containing compounds such as vinylamine, N,N-dimethylvinylamine, N,N-diethylvinylamine, N,N-dibutylvinylamine, N,N-t-butylvinylamine, N,N-diphenylvinylamine, N-vinylcarbazole, vinyl alcohol, vinyl chloride, vinyl fluoride, vinyl ether, acrylonitrile, N-vinyl-2-pyrrolidone, and acrylamide, N,N-dimethylacrylamide, carboxy-containing compounds such as carboxylic acid, phthalic acid, acrylic acid, and polyacrylic aid, and hydroxy-containing compounds such as butanol, ethylene glycol, and vinyl alcohol.

(Polymerization Initiator)

When the nitrogen-containing aromatic cyclic compound has a cross-linkable functional group, it is preferred to add a polymerization initiator. The polymerization initiator can be, for example, acids, alkalis, radical generators, or oxidants. It is preferred that the polymerization initiator be selected according to the type of the cross-linkable functional group. When the cross-linkable functional group is a vinyl group, radical generators and alkalis are preferable. When the cross-linkable functional group is a carboxy or hydroxy group, acids and alkalis are preferable.

(Binder Resin)

The conductive composition may contain a binder resin for adjusting coating properties such as coating formation, strength, and electric conductivity. The binder resin is preferably contained in view of the antistatic coating material because the coating has a harder surface and improved damage resistance and adhesion to a base. When an antistatic coating material contains a binder resin, an antistatic coating formed by antistatic coating material easily has a pencil hardness (JIS K 5400) of HB or harder.

The binder resin is not limited as long as it is compatible with or mixable/dispersible in the essential components of the conductive composition. The binder resin can be a reactive or nonreactive resin. The binder resin can be a heat-curable resin or a thermoplastic resin as long as it is compatible with or mixable/dispersible in the antistatic coating material. Examples of the binder resin include polyester resin such as polyethylene phthalate, polybutylene phthalate, and polyethylene naphthalate; polyimide resin such as polyimide and polyamideimide; polyamide resin such as polyamide 6, polyamide 6,6, polyamide 12, and polyamide 11; fluorine resin such as polyvinylidene fluoride, polyvinyl fluoride, polytetrafluoroethylene, ethylenetetrafluoroethylene copolymer, and polychlorotrifluoroethylene; vinyl resin such as polyvinyl alcohol, polyvinylether, polyvinyl butyral, polyvinyl acetate, and polyvinyl chloride; epoxy resin; xylene resin; aramide resin; polyurethane resin; polyurea resin; melamine resin; phenol resin; polyether; and acrylic resin and their copolymers.

The binder resin used in the antistatic coating material can be dissolved in an organic solvent or in water with a functional group such as a sulfo or carboxy group being added, or dispersed in water to form an emulsion.

Among these, one or more binder resins are preferably selected from polyurethane, polyester, acrylic resin, polyamide, polyimide, epoxy resin, and polyimide silicone because these are easy to mix. Acrylic resin is suitable for applications such as optical filters because of excellent hardness and transparence.

The acrylic resin preferably contains a heat-curable or photo-curable liquid polymer.

The heat-curable liquid polymer can be, for example, a reactive polymer or a self-cross-linkable polymer.

The reactive polymer is a polymer formed by polymerizing monomers having a substituent such as carboxy group, acid anhydride, oxetanes, glycidyl group, and amino group. Examples of the monomers include carboxylic acid compounds such as malonic acid, succinic acid, glutamic acid, pimelic acid, ascorbic acid, phthalic acid, acetylsalicylic acid, adipic acid, isophthalic acid, benzoic acid, and m-toluic acid, acid anhydrides such as maleic acid anhydride, phthalic acid anhydride, dodecylsuccinic acid anhydride, dichlormaleic acid anhydride, tetrachlorphthalic acid anhydride, and pyromellitic acid anhydride, oxetane compounds such as 3,3-dimethyloxetane, 3,3-dichloromethyloxetane, 3-methyl-3-hydroxymethyloxetane, and azidomethylmethyloxetane, glycidyl ether compounds such as bisphenol A diglycidyl ether, bisphenol F diglycidyl ether, phenolnovolacpolyglycidyl ether, N,N-diglycidyl-p-aminophenolglycidyl ether, tetrabromobisphenol A diglycidyl ether, hydrogenerated bisphenol A diglycidyl ether (namely, 2,2-bis(4-glycidyloxycyclohexyl)propane), glycidyl amine compounds such as N,N-diglycidylaniline, tetradiglycidyldiaminodiphenylmethane, N,N,N,N-tetraglycidyl-m-xylylenediamine, triglycidylisocyanurate, and N,N-diglycidyl-5,5-dialkylhydantoin, amine compounds such as diethylenetriamine, triethylenetetramine, dimethylaminopropylamine, N-aminoethylpiperazine, benzyldimethylamine, tris(dimethylaminomethyl)phenol, DHP30-tri(2-ethylhexoate), metaphenylenediamine, diaminophenylmethane, diaminodiphenylsulfone, dicyandiamide, boron trifluoride, monoethylamine, menthanediamine, xylenediamine, and ethylmethylimidazole, and glycidyl compounds from bisphenol A epichlorohydrin among compounds having two or more oxirane rings per molecule, and their analogs.

A cross-linker having at least two or more functional groups is used for the reactive polymerization. The cross-linker can be, for example, melamine resin, epoxy resin, or metal oxide. As for the metal oxide, basic metal compounds such as Al(OH)3, Al(OHC.CH3)2(OOCH), Al(OOC.CH3)2, ZrO(OCH3), Mg(OOC.CH3), Ca(OH)2, and Ba(OH)3 can be used as appropriate.

The self-cross-linkable polymerization involves self-cross-linking between functional groups when heated, and involve, for example, glycidyl and carboxyl groups or N-methylol and carboxy group.

The photo-curable liquid polymer may be, for example, polyester, epoxy resin, oxetane resin, polyacryl, polyurethane, polyimide, polyamide, polyamideimide, and polyimide silicone oligomers or prepolymers.

Examples of monomer units constituting a photo-curable liquid polymer include monofunctional and polyfunctional monomers of the following: acrylates such as bisphenol A •ethyleneoxide modified diacrylate, dipentaerythritolhexa(p-enta)acrylate, dipentaerythritolmonohydroxypentaacrylate, dipropyleneglycol diacrylate, trimethylolpropanetriacrylate, glycerinpropoxytriacrylate, 4-hydroxybutylacrylate, 1,6-hexadioldiacrylate, 2-hydroxyethlacrylate, 2-hydroxypropylacrylate, isobornylacrylate, polyethyleneglycoldiacrylate, pentaerythritoltriacrylate, tetrahydrofurfurylacrylate, tripropyleneglycoldiacrylate; methacrylates such as tetraethyleneglycol dimethacrylate, alkylmethacrylate, allylmethacrylate, 1,3-butyleneglycol dimethacrylate, n-butylmethacrylate, benzylmethacrylate, cyclohexylmethacrylate, diethyleneglycol dimethacrylate, 2-ethylhexylmethacrylate, glycidylmethacrylate, 1,6-hexanediol dimethacrylate, 2-hydroxyethylmethacrylate, isobornylmethacrylate, laurylmethacrylate, phenoxyethylmethacrylate, t-butylmethacrylate, tetrahydrofurfurylmethacrylate, and trimethylolpropanetrimethacrylate; glycidyl ethers such as allylglycidyl ether, butylglycidyl ether, higher alcohol glycidyl ether, 1,6-hexanediolglycidyl ether, phenylglycidyl ether, and stearylglycidyl ether; acryl (methacryl) amides such as diacetonacrylamide, N,N-dimethylacrylamide, dimethylaminopropylacrylamide, dimethylaminopropylmethacrylamide, methacrylamide, N-methylolacrylamide, N,N-dimethylacrylamide, acryloylmorpholine, N-vinylformamide, N-methylacrylamide, N-isopropylacrylamide, N-t-butylacrylamide, N-phenylacrylamide, acryloylpiperidine, and 2-hydroxyethylacrylamide; vinyl ethers such as 2-chloroethylvinyl ether, cyclohexylvinyl ether, ethylvinyl ether, hydroxybutylvinyl ether, isobutylvinyl ether, triethyleneglycol vinyl ether; carboxylic acid vinyl esters such as vinyl lactate, vinyl monochloroacetate, vinyl pivalate.

The photo-curable liquid polymer cures with a photopolymerization initiator. The photopolymerization initiator can be, for example, acetophenone, benzophenones, Michler's benzoylbenzoate, α-amyloxime ester, tetramethylthiurammonosulfide, or thioxanthone. A photosensitizer such as n-butylamine, triethylamine, and tri-n-butylphosphine can be mixed.

(Solvent)

The conductive composition may contain solvents. The aforementioned solvents capable of dissolving or dispersing precursor monomers of a π conjugated conductive polymer may be used.

The solvent used in the antistatic coating material and capacitor is not limited, and may be, for example, alcohol solvents such as methanol, ethanol, isopropyl alcohol (IPA); amide solvents such as N-methylpyrrolidone (NMP), and dimethylacetamide (DMAc), dimethylformamide (DMF), ketone solvents such as methylethylketone (MEK), acetone, and cyclohexane, ester solvents such as ethyl acetate and butyl acetate, toluene, xylene, and water. These can be used individually or in combination. Among them, in view of recent environmental considerations, environmental-friendly water and alcohol solvents are preferred.

The aforementioned conductive composition can be prepared by, for example, chemical oxidative polymerizing precursor monomers of a π conjugated conductive polymer in the presence of dopant and oxidant or oxidation polymerization catalysis and, then, adding a nitrogen-containing aromatic cyclic compound thereto.

For chemical oxidative polymerizing a π conjugated conductive polymer, the dopant forms a salt together with the π conjugated conductive polymer and the π conjugated conductive polymer is doped as it grows. Particularly, when the dopant is a sulfo group-containing solubilizing polymer, the sulfo group aggressively forms a salt together with the π conjugated conductive polymer; therefore, the π conjugated conductive polymer is strongly attracted to the main chain of the sulfo group-containing solubilizing polymer dopant. Consequently, the main chain of the π conjugated conductive polymer grows along the main chain of the sulfo group-containing solubilizing polymer dopant; thereby a regularly aligned π conjugated conductive polymer is easily formed. Forming a number of salts together with the sulfo group-containing solubilizing polymer dopant, the π conjugated conductive polymer synthesized in this manner is anchored to the main chain of the sulfo group-containing solubilizing polymer dopant and forms a mixture with it.

By adding a nitrogen-containing aromatic cyclic compound to the mixture of the π conjugated conductive polymer and dopant, the nitrogen-containing aromatic cyclic compound penetrates between the π conjugated conductive polymer and the dopant to form a conductive composition.

The aforementioned conductive composition contains a π conjugated conductive polymer, a dopant, and a nitrogen-containing aromatic cyclic compound. In this conductive compound, part of the nitrogen-containing aromatic cyclic compound partly coordinates or binds to protons or substituents from the dopant, being positively charged and becoming a cation of the nitrogen-containing aromatic cyclic compound. Therefore, a mixture of the nitrogen-containing aromatic cyclic compound cation and the remaining nitrogen-containing aromatic cyclic compound is present in the conductive composition. This mixture forms salts together with excessive anion groups of the dopant, is attracted to the dopant, penetrate into the π conjugated conductive polymer of the conductive composition. The presence of the nitrogen-containing aromatic cyclic cation compound and nitrogen-containing aromatic cyclic compound within the π conjugated conductive polymer causes the hopping energy for the electric conductivity of the π conjugated conductive polymer to drop and, therefore, improve the electric conductivity.

The conductive composition also has excellent heat resistance and moisture resistance.

The conductive cross-linked product of the present invention is described below.

The conductive cross-linked product of the present invention is formed by heating and/or irradiating with ultraviolet ray a conductive composition containing a nitrogen-containing aromatic cyclic compound having a cross-linkable functional group.

The conductive cross-linked product can be formed by, for example, applying a conductive composition solution to a base and removing the solvent by an appropriate technique, which is followed by heating and/or UV irradiation.

The conductive composition solution can be applied by, for example, immersion, comma coating, spray coating, roll coating, or gravure printing.

Either one or both of heat and UV irradiation treatments are selected according to the type of the cross-linkable functional group. Heating can be done by a conventional technique such as hot air heating and infrared heating. UV irradiation can done be by using a light source such as super high pressure mercury lamp, high pressure mercury lamp, low pressure mercury lamp, carbon arc, xenon arc, and metal halide lamp.

Because the cross-linkable nitrogen-containing aromatic cyclic compound is cross-linked, the conductive cross-linked product is highly compact, consequently being not only highly conductive but also highly heat resistant, thermally stable, and solvent resistant.

An embodiment of the capacitor of the present invention and the production method thereof is described below.

FIG. 1 is an illustration to show the structure of a capacitor of this embodiment. The capacitor 10 comprises an anode 11 composed of a porous body of valve metal, a dielectric layer formed by oxidizing the surface of the anode 11, and a cathode provided on the dielectric layer.

<Anode>

The valve metal of anode 11 may be, for example, aluminum, tantalum, niobium, titanium, hafnium, zirconium, zinc, tungsten, bismuth, or antimony. Among them, aluminum, tantalum, and niobium are preferred.

Specifically, the anode 11 may be an aluminum foil that is etched for an extended surface area and oxidized on the surface or a pellet formed by sintering tantalum or niobium particles and oxidizing the surface of the sintered mass. The anodes prepared in these ways have a rough surface.

<Dielectric Layer>

The dielectric layer 12 is formed by anodizing the surface of the anode 11 in an electrolyte such as an aqueous ammonium adipate. As shown in FIG. 1, the dielectric layer 12 also has a rough surface like the anode 11.

<Cathode>

The cathode 13 comprises a solid electrolyte layer 13a and a cathode conductive layer 13b made of, for example, carbon, silver, or aluminum deposited on the solid electrolyte layer 13a. The solid electrolyte layer 13a contains a π conjugated conductive polymer and provided on the dielectric layer 12 side.

When the cathode conductive layer 13b is made of carbon, silver, and the like, it can be formed using a conductive paste containing carbon, silver, and the like. When the cathode conductive layer 13b is made of aluminum, it can be formed using, for example, aluminum foil.

A separator can be provided between the solid electrolyte layer 13a and the anode 11 where necessary.

The electron donor compound of a capacitor having an electron donor compound layer containing an electron donor element is a compound containing an electron donor element, not a polymer.

The electron donor element contained in an electron donor compound is preferably at least one or more elements selected from nitrogen, oxygen, phosphorus, and sulfur among the elements in the groups 15 and 16 of the periodic table of the elements because the electric affinity between the dielectric layer and the cathode containing a π conjugated conductive polymer is improved.

The nitrogen-containing electron donor compound is preferably primary amine, secondary amine, or tertiary amine for improved electric affinity between the dielectric layer and the cathode. Examples of amines specifically include aliphatic amines such as ethylamine, diethylamine, methylethylamine, and triethylamine, and aromatic amines such as aniline, benzylamine, pyrrole, imidazole, pyridine, pyrimidine, pyrazine, and triazine, and their derivatives.

The oxygen-containing electron donor compound may be, for example, alcohols, ethers, and ketones. Their examples specifically include lauryl alcohol, hexadecyl alcohol, benzyl alcohol, ethylene glycol, propylene glycol, glycerin, diphenyl ether, cyclohexane, diacetone alcohol, isophorone, furan, and their derivatives.

The phosphorus-containing electron donor compound may be, for example, phosphoric acid ester, phosphorous acid ester, phosphonic acid, alykylphosphine, or alykylphosphonium salt. Their examples specifically include trimethyl phosphate, triphenyl phosphate, trimethyl phosphite, triethyl phosphite, dimethyl phosphonate, diethyl phosphonate, triethylphosphine, tri-n-butylphosphine, tri-n-butylphosphineoxide, tetraethylphosphoniumbromide, and tetra-n-butylphosphoniumbromide.

The sulfur-containing electron donor compound may be, for example, sulfides, thiols, isothiocyanates, thiophenes and their derivatives. Their examples specifically include dimethysulfide, diethylsulfide, methylmercaptan, ethylmercaptan, phenylisothiocyanate, n-butylisothiocyanate, thiophene, and 3-methylthiophene.

Among these electron donor compounds, compounds containing nitrogen, oxygen, or sulfur in the aromatic ring are preferred because the equivalent series resistance does not drop even though they remain in the dielectric layer. Compounds containing nitrogen in the aromatic ring include pyrrole and their derivatives (pyrroles), imidazole, pyridine, pyrimidine, pyrazine, pyrazine, and triazine and their derivatives. Compounds containing oxygen in the aromatic ring include furan and their derivatives (furans). Compounds containing sulfur in the aromatic ring include thiophene and their derivatives (thiophenes). Among these, at least one compound selected from pyrroles, thiophenes, and furans is preferable because the electric affinity between the dielectric layer and the cathode is improved.

The nitrogen, oxygen or sulfur atom of an electron donor compound containing nitrogen, oxygen, or sulfur in the aromatic ring has an unshared electron pair. Therefore, a substituent or a proton is easily coordinated or bound to these atoms. When a substituent or a proton is easily coordinated or bound to the nitrogen, oxygen or sulfur atom, the atoms tend to be positively charged. The nitrogen, oxygen or sulfur atom is conjugated to another atom. The cationic charge generated by the substituent or proton coordinated or bound to these atoms is diffused and stably present in the aromatic ring.

Therefore, electron donor compounds containing nitrogen, oxygen, or sulfur in the aromatic ring may be in the form of a cation with a substituent being introduced in a nitrogen, oxygen, or sulfur atom. Further, the cation may form a salt together with an anion. Electron donor compounds in the form of a salt exert the same effect as non-cation electron donor compounds.

The aforementioned capacitor has an electron donor compound applied to the dielectric layer surface. The dielectric layer surface is neutralized in terms of charge. Therefore, the electric affinity between the dielectric layer and the solid electrolyte layer containing a π conjugated conductive polymer is improved. Consequently, the resistance at the interface between the dielectric layer and the cathode is reduced; the capacitor has low impedance and high electrostatic capacity.

(Production of a Capacitor)

An embodiment of the method of producing a capacitor of the present invention is described below.

An embodiment of the method of producing a capacitor, comprising the steps of: a first step of oxidizing a surface of an anode composed of a porous material of valve metal and forming a dielectric layer; a second step of applying an electron donor compound containing an electron donor element to a surface of the dielectric layer and forming an electron donor compound layer; and a third step of forming a solid electrolyte layer containing a π conjugated conductive polymer on a surface of the electron donor compound layer.

In the method of producing a capacitor, the anode surface can be oxidized by, for example, anodizing the anode surface in an electrolyte solution such as an aqueous ammonium adipate.

The electron donor compound can be applied to the dielectric layer surface by a known application technique such as coating, immersion, and spray. When the electron donor compound is in a solid form, the electron donor compound is dissolved in a solvent before it is applied. In such a case, it is preferred that the solvent be removed through drying after the application. It is also preferred that the solvent be removed when a liquid electron donor compound is diluted for use.

The concentration of the electron donor compound is not limited. However, the effect may not be apparent when it is excessively low. On the other hand, the ESR may drop when it is excessively high. The concentration is preferably 1 to 80% by weight, more preferably 5 to 50% by weight.

A layer containing a π conjugated conductive polymer is preferably formed by applying a conductive polymer solution of the π conjugated conductive polymer dissolved in a solvent to the dielectric layer surface because it is simple and the electric affinity between the dielectric layer and cathode can be easily improved. Alternatively, precursor monomers composing a π conjugated conductive polymer can be directly chemical oxidative polymerized or electrolytic polymerized on the dielectric layer.

A conductive polymer solution is obtained by polymerizing precursor monomers of a π conjugated conductive polymer in the presence of anion-containing solubilizing polymer, or obtained by dissolving a π conjugated conductive polymer having solvent solubility into a solvent.

An example of a preparation method of a conductive polymer solution by polymerizing precursor monomers of a π conjugated conductive polymer in the presence of anion-containing solubilizing polymer, comprises the steps of: dissolving an anion-containing solubilizing polymer into a solvent which is able to dissolve the polymer, adding precursor monomers of π conjugated conductive polymer to the obtained solution, polymerizing the precursor monomers by adding an oxidant, and then removing the excess oxidant and precursor monomers and purifying to obtain the conductive polymer solution.

The usable anion-containing solubilizing polymers are selected from the above-described examples.

The conductive polymer solution may contain a dopant except the anion-containing solubilizing polymer in order to improve conductivity of the π conjugated conductive polymer. The dopant is selected from the above-described examples.

The ratio of a π conjugated conductive polymer and a dopant is preferably 97:3 to 10:90 (π conjugated conductive polymer: dopant). If the dopant content is over or under this range, conductivity of the π conjugated conductive polymer tends to decrease.

Examples of coating method of the conductive polymer solution include known methods such as coating, immersion, and spray, and dried by a known technique such as hot air drying.

A capacitor is obtained by forming a cathode using known methods such as a method forming the solid electrolyte layer, penetrating the electrolyte into the layer if necessary, and forming a cathode conductive layer by applying carbon or silver paste, and a method providing the cathode conductive layer such as aluminum foil via a separator.

When a separator is used, the separator can be a single or mixed non-woven fabric such as cellulose fiber, glass fiber, polypropylene fiber, polyester fiber, and polyamide fiber or carbide non-woven fabrics prepared by carbonizing them In the aforementioned method of producing a capacitor, an electron donor compound is applied to the dielectric layer surface, by which the electric affinity between the dielectric layer and the solid electrolyte layer is improved and, therefore, the impedance can be reduced. Moreover, an electron donor compound is simply applied. Hence, according to the aforementioned method of producing a capacitor, a low impedance capacitor can be produced in a simple manner.

Furthermore, capacitors produced by the aforementioned method have high electrostatic capacity and excellent heat resistance.

The capacitor having an electron donor compound layer of the present invention is not limited to the aforementioned embodiment. In the aforementioned embodiment, an electron donor compound is applied to the dielectric layer surface, a solid electrolyte layer is formed, and, then, a conductive cathode layer is provided to form a cathode, by which a capacitor is obtained. In the present invention, the cathode conductive layer can be provided at any time. For example, an electron donor compound is applied to the dielectric layer surface and a solid electrolyte layer is formed after a conductive cathode layer is provided in a manner in which it faces the dielectric layer. In such a case, a separator is preferably provided between the cathode conductive layer and the dielectric layer.

The electron donor compound can be applied to the dielectric layer side surface of the cathode conductive layer and the separator beside the dielectric layer surface.

Another embodiment of the method of producing a capacitor, comprising a step of applying a conductive polymer solution containing a π conjugated conductive polymer, a dopant, a nitrogen-containing aromatic cyclic compound, and a solvent to a surface of a dielectric layer of a capacitor intermediate comprising an anode composed of a porous material of valve metal and the dielectric layer formed by oxidizing a surface of the anode, and forming a coating.

A conductive polymer solution is prepared by dissolving an anion group-containing solubilizing polymer in a solvent that can dissolve the polymer, adding precursor monomers for constituting the conductive polymer such as un-substituted aniline or pyrrole or thiophene to the obtained solution, adding oxidant to polymerize the monomers, removing the extra oxidant and monomers for refining, and adding a nitrogen-containing aromatic cyclic compound to obtain a conductive polymer solution.

Known oxidants can be used for polymerizing the conductive polymer, including metal halogen compounds such as iron (II) chloride, boron trifluoride, and aluminum chloride; peroxides such as hydrogen peroxide and benzoyl peroxide; persulfates such as potassium persulfate, sodium persufate, and ammonium persulfate; ozone; and oxygen.

The conductive polymer solution can be applied by known methods such as coating, immersion, and spray, and dried by known methods such as hot air drying.

After the solid electrolyte layer is formed, the layer may be penetrated with the electrolyte, if necessary. Then, a cathode is formed by carbon or silver paste or a known technique such as providing a cathode electrode in the opposite position via a separator.

When a separator is used, the separator can be a single or mixed non-woven fabric such as cellulose fiber, glass fiber, polypropylene fiber, polyester fiber, and polyamide fiber or carbide non-woven fabrics prepared by carbonizing them.

In the aforementioned method, the conductive polymer solution is applied and dried to form a solid electrolyte layer. Therefore, the process is simple and suitable for mass-production, and realizes low cost. Containing a π conjugated conductive polymer, a dopant, and a nitrogen-containing aromatic cyclic compound, the conductive polymer solution provides a highly conductive solid electrolyte layer.

The solid electrolyte layer can be formed by chemical oxidative polymerization or electrolytic polymerization where a simple and low cost process is not emphasized.

In the chemical oxidative polymerization, a solution of precursor monomers for constituting a π conjugated conductive polymer, such as substituted or un-substituted aniline or pyrrole or thiophene and an oxidant solution are prepared. A capacitor intermediate is alternately immersed in these solutions to form the conductive polymer on the dielectric layer surface of the capacitor. The same oxidant can be used.

The dopant and nitrogen-containing aromatic cyclic compound can be simultaneously dissolved in the monomer solution or in the oxidant solution. Alternatively, a solution of the dopant and nitrogen-containing aromatic cyclic compound in a solvent is allowed to soak into the π conjugated conductive polymer after the π conjugated conductive polymer is formed.

In the electrolytic polymerization, precursor monomers for constituting a π conjugated conductive polymer such as un-substituted aniline, pyrrole, or thiophene are introduced in a solvent such as acetonitrile. A capacitor intermediate having a conductive layer formed on the surface is introduced in an electrolytic bath where dopant is added as electrolyte. A higher voltage than the oxidation potential of the precursor monomers is applied for polymerization, thereby a π conjugated conductive polymer is formed on the dielectric layer of the capacitor intermediate.

The nitrogen-containing aromatic cyclic compound can be dissolved in the electrolytic bath. Alternatively, a solution of the nitrogen-containing aromatic cyclic compound in a solvent can be allowed to soak into the π conjugated conductive polymer after the conductive polymer is formed.

When the solid electrolyte layer is formed by application of a conductive polymer solution or chemical oxidative polymerization, since the π conjugated conductive polymer has a large particle size, the π conjugated conductive polymer cannot reach deep inside the fine gaps on the dielectric layer surface of the capacitor intermediate, making it difficult to derive electrostatic capacity. It is preferred that the cathode has electrolyte and the electrolyte is allowed to soak into the dielectric layer so as to complement the electrostatic capacity.

When the nitrogen-containing aromatic cyclic compound has a cross-linkable functional group, it is preferred that the coating is subject to heating and/or UV irradiation after it is formed by applying a conductive polymer solution. Either one or both of heating and UV irradiation are selected according to the type of the cross-linkable functional group.

Heating can be done by a conventional technique such as hot air heating and infrared heating. UV irradiation can be done by using a light source such as super high pressure mercury lamp, high pressure mercury lamp, low pressure mercury lamp, carbon arc, xenon arc, and metal halide lamp.

[Electrolyte]

The electrolyte is not limited as long as it has a high electric conductivity. It can be a known electrolyte dissolved in a known solvent.

Examples of the solvent include water; alcohol solvents such as ethylene glycol, diethylene glycol, propylene glycol, 1,4-butanediol, and glycerin; lactone solvents such as γ-butyrolactone, γ-valerolactone, and δ-valerolactone; amide solvents such as N-methylformamide, N,N-dimethylformamide, N-methylacetamide, and N-methylpyrrolidinone; and nitrile solvents such as acetonitrile, and 3-methoxypropionitrile.

Examples of the electrolyte include, as anion components, adipic acid, glutaric acid, succinic acid, benzoic acid, isophthalic acid, phthalic acid, terephthalic acid, maleic acid, toluic acid, enanthic acid, malonic acid, and formic acid; decandicarboxylic acid such as 1,6-decanedicarboxylic acid and 5,6-decanedicarboxylic acid; octanedicarboxylic acids such as 1,7-octanedicarboxylic acid; organic acids such as azelaic acid and sebacic acid; or coral, coral polyalcohol complex compounds obtained from coral and polyalcohol; and inorganic acids such as phosphoric acid, carbonic acid, and silicic acid; and, as cation components, primary amine (methylamine, ethylamine, propylamine, butylamine, ethyleneamine); secondary amine (dimethylamine, diethylamine, dipropylamine, methylethylamine, diphenylamine); and tertiary amine (trimethylamine, triethylamine, tripropylamine, triphenylamine, 1,8-diazacyclo(5,4,0)-undecene-7), tetraalkylammmonium (tetramethylammonium, tetraethylammonium, tetrapropylammonium, tetrabutylammonium, methyltriethylammonium, dimethyldiethylammonium).

Embodiments of the methods of producing an antistatic coating material, an antistatic coating, an antistatic film, an optical film, and an optical information recording medium are described below.

[Production Method]

(Antistatic Coating Material)

For producing an antistatic coating material, first, a solubilizing polymer is dissolved in a solvent than can dissolve the polymer. Precursor monomers of a conductive compound and, where necessary, a dopant are added and the mixture is well stirred.

An oxidant is added dropwise to the mixture to allow the polymerization, thereby a composite material of the conductive compound and the solubilizing polymer is obtained. After removing the oxidant, monomer residue, and byproducts and refining, the composite material is dissolved in an appropriate solvent. A nitrogen-containing aromatic cyclic compound and, where necessary, a dopant, a binder resin, and a cross-linkable compound are added to obtain an antistatic coating material.

A known oxidant can be used for polymerizing precursor monomers of a conductive polymer. Examples of the oxidant include metal halogen compounds such as iron (II) chloride, boron trifluoride, and aluminum chloride, peroxides such as hydrogen peroxide and benzoyl peroxide, persulfates such as potassium persulfate, sodium persulfate, and ammonium persulfate, ozone, and oxygen.

Refining technique is not particularly limited. For example, reprecipitation and ultrafiltration can be used. Ultra-filtration is preferred because it is simple. Ultra-filtration is a technique wherein a solution is circulated on a porous ultrafiltration membrane, allowing the liquid of the solution to permeate the membrane. In this technique, there is a difference in pressure between the circulating solution side and the permeated solution side of the ultrafiltration membrane. Therefore, the circulating solution partly penetrates into the permeated solution side to alleviate the pressure on the circulating solution side. Along with the penetration of the circulating solution, some of the particles having a particle size smaller than the ultrafiltration membrane opening and dissolved ions moves to the permeated solution side, thereby the particles and dissolved ions are removed. The ultrafiltration membrane used can selectively have a differential molecular weight of 1000 to 1000000 according to the particle sizes and ion types to be removed.

(Antistatic Coating)

An antistatic coating is formed by applying the antistatic coating solution to a base. The antistatic coating solution can be applied by, for example, immersion, comma coating, spray coating, roll coating, or gravure printing. The base is not limited. Molded resins, particularly resin films, which are easily electro-statically charged, are preferred.

After application, the solution is heated to remove the solvent or heat- or photo-cured.

Heating can be done by a conventional technique such as hot air heating and infrared heating. Photo-curing to form a coating can be done by UV irradiation using a light source such as super high pressure mercury lamp, high pressure mercury lamp, low pressure mercury lamp, carbon arc, xenon arc, and metal halide lamp.

Containing a nitrogen-containing aromatic cyclic compound, the antistatic coating has a remarkably high conductivity. Specifically, the antistatic coating has an electric conductivity of approximately 10 to 2000 S/cm when it contains a nitrogen-containing aromatic cyclic compound while the antistatic coating has an electric conductivity of approximately 0.001 to 100 S/cm when it does not contain a nitrogen-containing aromatic cyclic compound. Therefore, higher conductivity is obtained even though it is itself a conductive polymer.

When the antistatic coating material contains a nitrogen-containing aromatic cyclic compound, the nitrogen-containing aromatic cyclic compound is cross-linked by heating or UV irradiation. The antistatic coating is densely interconnected, consequently being not only highly conductive but also more heat resistant and thermally stable.

When an antistatic coating is used in optical applications, particularly in optical filters and optical information recording media described later, it is preferred that the antistatic coating be highly transparent. Specifically, the antistatic coating preferably has a total light transmittance (JIS Z 8701) of 85% or higher, more preferably 90% or higher, most preferably 96% or higher. The antistatic coating preferably has a haze (JIS K 6714) of 5% or lower, preferably 3% or lower, most preferably 1% or lower.

When the antistatic coating also serves as a hard coat layer, the antistatic coating preferably has a surface hardness (pensile hardness) of HB or harder.

The surface resistance of the antistatic coating is preferably adjusted as appropriate in view of optical properties. Generally, approximately $1 \times 10^3 \Omega$ to $1 \times 10^{12} \Omega$ is preferable for antistatic use.

The total light transmittance, haze, and surface resistance of a coating can be adjusted by the thickness of the antistatic coating. It is preferred to exclude binder resins where a lower surface resistance is required. However, it is preferred to contain binder resins where low cost and better adhesion to a base are required.

(Antistatic Film)

An antistatic film comprises a base film and the aforementioned antistatic coating on at least one side of the base film.

[Substrate Film]

Examples of the base film include low density polyethylene film, high density polyethylene film, ethylene-propylene copolymer film, polypropylene film, ethylene-vinyl acetate copolymer film, ethylene-methylmethacrylate copolymer film, polyethyleneterephthalate (PET) film, polybutyleneterephthalate (PBT) film, polyethylenenaphthalate (PEN) film, polyimide film, 6-nylon film, 6,6-nylon film, polymethylmethacrylate film, polystyrene film, styrene-acrylonitrile-butadiene copolymer film, polyacrylonitrile film, cellulose triacetate (TAC) film, cellulose propionate film, polyvinyl chloride film, polyvinylidene chloride film, polyvinylidene fluoride film, polyethylene tetrafluoride film, polyvinyl alcohol coating film, ethylene-vinyl alcohol copolymer film, polycarbonate film, polysulfone film, polyethersulfone film, polyetherether ketone film, and polyphenyleneoxide film.

These base films generally have lipophilic surfaces. Therefore, it is difficult to apply an antistatic coating dissolved in an aqueous solvent. Then, when an antistatic coating material dissolved in an aqueous solvent is used, it is preferred that the base film surface be treated by, for example, etching such as sputtering, corona discharge, blazing, UV irradiation, electron irradiation, chemical conversion, and oxidation or base coating for hydrophilicity. Furthermore, solvent cleaning or ultrasonic cleaning may be performed for ducting and cleanup where necessary.

(Optical Filter)

An embodiment of the optical filter of the present invention is described below.

Figure 2:
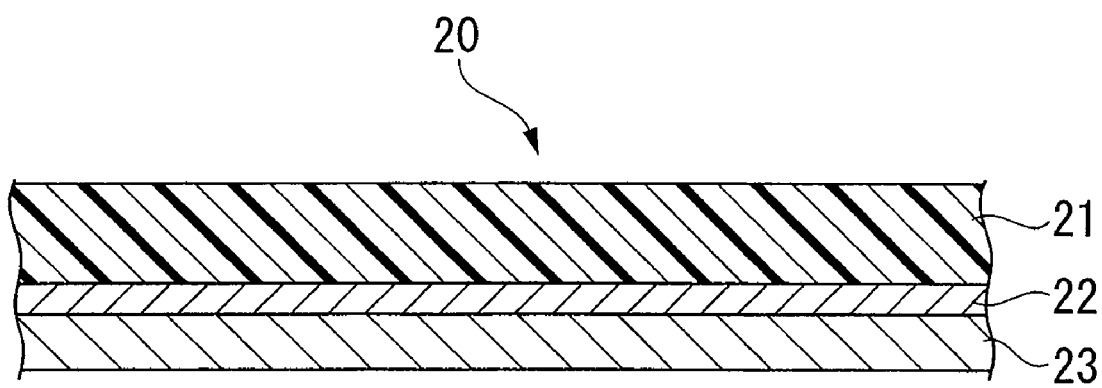
FIG. 2 is a cross-sectional view showing an embodiment of the optical filter according to the present invention.

FIG. 2 shows an optical filter of this embodiment. An optical filter 20 comprises a film base 21, an antistatic coating 22 formed on the film base 21, and an anti-reflection layer 23 formed on the antistatic layer 22. The antistatic coating 22 of the optical filter 20 also serves as a hard coat layer.

In order to attach the optical filter 20 to the display screen of a display apparatus, a transparent adhesive layer is provided on the surface of the film base 21 of the optical filter 20 and the optical filter is attached via this adhesive layer.

Any type of transparent plastic films can be used as the film base 21. Examples of transparent plastic films include those made of polyethylene terephthalate, polyimide, polyethersulfone, polyetheretherketone, polycarbonate, polypropylene, polyamide, acrylamide, cellulose, and propionate.

It is preferred that the film base has a surface treated by, for example, etching such as sputtering, corona discharge, blazing, UV irradiation, electron irradiation, chemical conversion, and oxidation or primary coating. With the surface being thus treated, the film base has better adhesion to the antistatic coating 22.

The surface of the film base 21 can be cleaned by solvent cleaning or ultrasonic cleaning for ducting and cleanup where necessary before the antistatic coating 22 is attached.

The antistatic coating 22 is a coating made of an antistatic coating material as described above and also serves as a hard coat layer. Therefore, as mentioned above, it is preferred that the antistatic coating 22 has a surface hardness (pencil hardness) of HB or harder. Further, because of optical use, the antistatic coating 22 preferably has a total light transmittance (JIS Z 8701) of 85% or higher, more preferably 90% or higher, most preferably 96% or higher. The antistatic coating 20 preferably has a haze (JIS K 6714) of 5% or lower, preferably 3% or lower, and most preferably 1% or lower.

The anti-reflection layer 23 prevents light reflection. This layer can be a monolayer or a multilayer. When it is a monolayer, it is preferred that the anti-reflection layer has a refractive index of 1.38 to 1.45 and an optical film thickness of 80 to 100 nm.

The anti-reflection layer 23 can be formed by a dry or wet method. Examples of the dry method include physical vapor deposition such as electron beam deposition, dielectric heating deposition, resistance heating deposition, sputtering, and ion plating and plasma CVD. When it is formed by a dry method, the anti-reflection layer 23 can contain inorganic compound components such as silicon oxide, magnesium oxide, niobium oxide, titanium oxide, tantalum oxide, aluminum oxide, zirconium oxide, indium oxide, and tin oxide.

In the wet method, a coating material containing a curable compound is applied by a known technique such as comma coating, spray coating, roll coating, and gravure printing and, then, cured. Usable curable compounds for forming the anti-reflection layer 23 by a wet method include fluorine-containing compounds such as fluorine-containing organic compounds, fluorine-containing organic silicon compounds, and fluorine-containing inorganic compounds.

The optical filter 20 can further comprise an anti-fouling layer on the anti-reflection layer 23. The anti-fouling layer serves to prevent dust and stain and make cleaning easy when it gets dirt.

The anti-fouling layer is not particularly limited as long as it does not interfere with the anti-reflection function of the anti-reflection layer 23 and is highly water repellent and oil repellent. It can be an organic compound layer or an inorganic compound layer. The anti-fouling layer can be, for example, a layer containing an organic silicon compound having a perfluorosilane or fluorocycloalkyl group or a fluorine organic compound.

The anti-fouling layer can be formed by a techniques selected according to its type, including physical vapor phase deposition method or chemical vapor phase deposition method such as vapor deposition, sputtering, and ion plating, vacuum process such as plasma polymerization, micro gravure, screen coating, and dip coating.

The aforementioned optical filter 20 has the antistatic coating 22 for protecting the film base 21. The antistatic coating 22 is made of the aforementioned antistatic coating material, being highly transparent and showing good adhesion to the film base 21. The optical filter 20 has a stable antistatic property, which keeps dust away from it.

The optical filter 20 as described above can be preferably used in anti-reflection films for liquid crystal displays and plasma displays, infrared absorptive films, and electromagnetic wave absorptive films.

The optical filter of the present invention is not limited to the aforementioned embodiment as long as it has an antistatic coating made of the aforementioned antistatic coating material. For example, the film base can be replaced with a polarizing plate. The polarizing plate can be a laminate of a polyvinyl alcohol resin film in which a dichromatic colorant is absorbed and oriented and a protective film(s) on one or both sides of the film. Iodine or a dichromatic dye can be used as the dichromatic colorant. Such a filter can be provided to the most front surface of a liquid crystal display.

(Optical Information Recording Medium)

An embodiment of the optical information recording medium of the present invention is described below.

Figure 3:
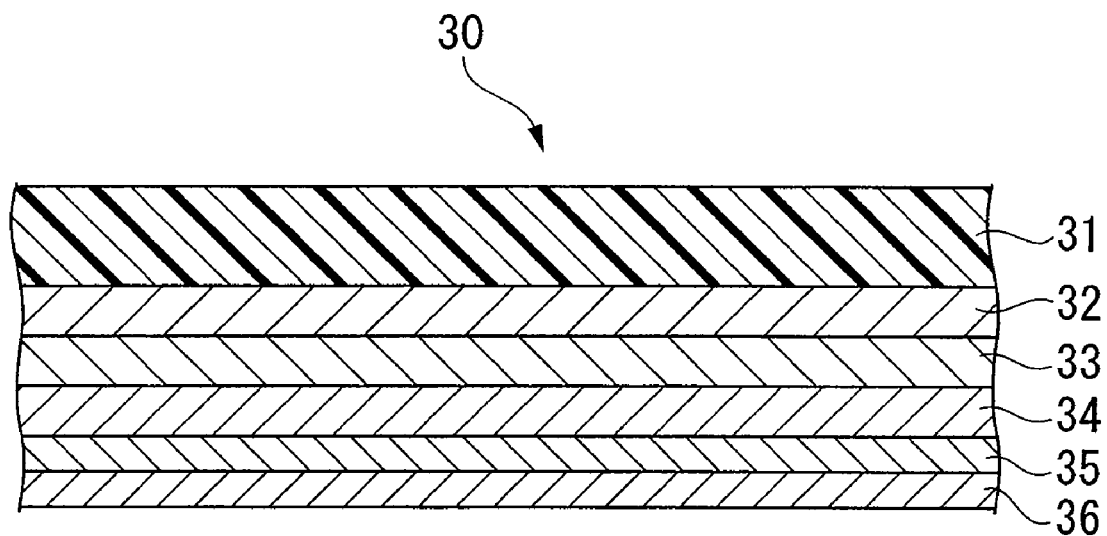
FIG. 3 is a cross-sectional view showing an embodiment of the optical information recording medium according to the present invention.

FIG. 3 shows an optical information recording medium of this embodiment. An optical information recording medium 30 is a rewritable disk comprising a transparent resin disc base 31 made of polycarbonate or polymethylmethacrylate, a first dielectric layer 32, an optical information recording layer 33, a second dielectric layer 34, a metal reflection layer 35, and an antistatic layer 36, which are formed in sequence.

The first and second dielectric layers 32 and 34 can be made of inorganic materials such as SiN. SiO, SiO2, and Ta2O5.

These dielectric layers can be formed to a thickness of 10 to 500 nm by a known technique such as vacuum deposition, sputtering, and ion plating.

The optical information recording layer 33 can be made of, for example, inorganic photomagnetic recording materials such as Tb—Fe, Tb—Fe—Co, Dy—Fe—Co, and Tb—Dy—Fe—Co, inorganic phase-conversion recording materials such as TeOx, Te—Ge, Sn—Te—Ge, Bi—Te—Ge, Sb—Te—Ge, Pb—Sn—Te, and Tl—In—Se, and organic dyes such as cyanine dye, polymethine dye, phthalocyanine dye, merocyanine dye, azulene dye, and squalium dye.

When it is made of an inorganic material, the optical information recording medium 33 can be formed to a thickness of 10 to 999 nm by a known technique such as vacuum deposition, sputtering, and ion plating. When it is made of an organic dye, the optical information recording medium 33 can be formed by applying a solution of the organic dye in a solvent such as acetone, diacetone alcohol, ethanol, and methanol using a known printing or application technique to a thickness of 10 to 999 nm.

The metal reflection layer 35 reflects light. It is made of metals such as Al, Cr, Ni, Ag, and Au and their oxides and nitrides. They can be used individually or in combination of two or more. The metal reflection layer 35 is formed by sputtering or vacuum deposition to a thickness of 2 to 200 nm.

The antistatic coating 36 is made of the aforementioned antistatic coating material. Having a surface hardness of HB or harder, the antistatic coating 36 serves to protect the surface of the optical information recording medium 30 from being damaged, to protect the metal reflection layer 35 from being oxidized, and to prevent adhesion of dust caused by static electricity.

The antistatic coating 36 preferably has a thickness of 3 to 15 μm. When the thickness is smaller than 3 μm, it is often difficult to form a uniform coating; thereby the antistatic coating may fail to provide sufficient antistatic or damage resistant property or antioxidation effect on the metal reflection layer 35. When the thickness is larger than 15 μm, the inner stress is increased. Therefore, the optical information recording medium 30 may have deteriorated mechanical properties.

The antistatic coating 36 can be formed by applying the antistatic coating material to the metal reflection layer 35 using a known technique such as comma coating, spray coating, roll coating, and gravure printing, which is followed by drying the solvent or heat- or UV-curing.

The aforementioned optical information recording medium 30 has the antistatic coating 36 that serves to protect the optical information recording layer 33 and metal reflection layer 35. The antistatic coating 36 is made of the aforementioned antistatic coating material. Therefore, the antistatic coating 36 has a small haze and a high light transmittance, being highly transparent at reading laser wavelengths of 780 and 635 nm. With its antistatic property, the antistatic coating 36 serves to control dust adhesion caused by static electricity and, therefore, prevent reading and writing errors.

The optical information recording medium of the present invention is not limited to the aforementioned embodiment. For example, it can be a recordable disc. The recordable disc comprises, for example, a transparent resin base (organic material), an optical information recording layer, a reflection metal layer, and an antistatic coating, which are formed in sequence.

EXAMPLES

Examples of the present invention are described below. However, the present invention is not limited to these examples.

[Conductive Composition]

Preparation Example 1

Preparation of Polyisoprenesulfonic Acid

Sodium isoprenesulfonate in the amount of 171 g (1 mol) was dissolved in 1000 ml of ion-exchanged water. An oxidant solution of 1.14 g (0.005 mol) of ammonium persulfate previously dissolved in 10 ml of water was added in drops to the solution over 20 minutes while stirring at 80° C. The solution was stirred for 12 hours.

10% by weight diluted sulfuric acid in the amount of 1000 ml was added to the obtained sodium isoprenesulfonate polymer solution and approximately 1000 ml of sodium isoprenesulfonate solution was removed by ultrafiltration. An amount of 2000 ml of ion-exchanged water was added to the remaining solution and approximately 2000 ml of the solution was removed by ultrafiltration. This ultrafiltration operation was repeated three times.

Then, approximately 2000 ml of ion-exchanged water was added to the obtained filtrate and approximately 2000 ml of the solution was removed by ultrafiltration. This ultrafiltration operation was repeated three times.

The ultrafiltration conditions were as follows (the same was applied to the other examples).
Differential molecular weight of the ultrafiltration membrane: 30K
Cross flow system
  Feed rate: 3000 ml/min.
  Membrane partial pressure: 0.12 Pa
Water in the obtained solution was removed under reduced pressure to obtain a colorless solid material.

Preparation Example 2

Preparation of Polystyrenesulfonic Acid

Sodium styrenesulfonate in the amount of 206 g (1 mol) was dissolved in 1000 ml of ion-exchanged water. An oxidant solution of 1.14 g (0.005 mol) of ammonium persulfate previously dissolved in 10 ml of water was added in drops to the solution over 20 min. while stirring at 80° C. The solution was stirred for 12 hours.

10% by weight diluted sulfuric acid in the amount of 1000 ml and water in the amount of 15000 ml were added to the obtained sodium styrenesulfonate solution and approximately 13000 ml of sodium styrenesulfonate solution was removed by ultrafiltration. 12000 ml of ion-exchanged water is added to the remaining solution and approximately 13000 ml of the solution was removed by ultrafiltration. This ultrafiltration operation was repeated three times.

Then, approximately 12000 ml of ion-exchanged water was added to the obtained filtrate and approximately 13000 ml of the solution was removed by ultrafiltration. The ultrafiltration operation was repeated three times.

Example 1

The amount of 14.2 g (0.1 mol) of 3,4-ethylenedioxythiophene and a solution of 27.5 g (0.15 mol) of polystyrenesulfonic acid in 2000 ml of ion-exchanged water were mixed at 20° C.

An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining at 20° C. and stirring. Then, the mixture was stirred and allowed to react for 3 hours.

Ion-exchanged water in the amount of 2000 ml was added to the obtained reaction solution and approximately 2000 ml of the solution was removed by ultrafiltration. This operation was repeated three times.

Diluted sulfuric acid in the amount of 200 ml of 10% by weight and 2000 ml of ion-exchanged water were added to the ultra-filtered solution and approximately 2000 ml of the solution was removed by ultrafiltration. The amount of 2000 ml of ion-exchanged water was added and approximately 2000 ml of the solution was removed. This operation was repeated three times.

Then, 2000 ml of ion-exchanged water was added to the obtained solution and approximately 2000 ml of the solution was removed by ultrafiltration. This operation was repeated five times. Approximately 1.5% by weight of blue polystyrenesulfonic acid doped poly(3,4-ethylenedioxythiophene) was obtained. This was indicated as a π conjugated conductive polymer solution A.

The amount of 0.56 g of imidazole was uniformly dispersed in 100 ml of the obtained π conjugated conductive polymer solution A to obtain a conductive composition solution.

The components used are shown in Table 1.

The conductive composition solution was applied to a glass and dried in an oven at 150° C. to obtain a coating of the conductive composition. The obtained coating was evaluated for electric properties by the following evaluation method. The results are shown in Table 2.

TABLE 1

|  | π conjugated conductive polymer | Dopant | Nitrogen-containing aromatic cyclic compound |
|---|---|---|---|
| Example 1 | poly(3,4-ethylenedioxythiophene) | polystyrenesulfonic acid | imidazole |
| Example 2 |  |  |  |
| Example 3 |  |  |  |
| Example 4 |  |  |  |
| Example 5 |  |  | 1,2-dimethylimidazole |
| Example 6 |  |  |  |
| Example 7 |  |  |  |
| Example 8 |  |  | pyridinesulfonic acid |
| Example 9 |  | polyisoprenesulfonic acid | imidazole |
| Example 10 | polypyrrole | polystyrenesulfonic acid | imidazole |
| Example 11 |  | polyisoprenesulfonic acid |  |
| Comparative Example 1 | polypyrrole | polyacrylic acid | — |
| Comparative Example 2 | poly(3,4-ethylenedioxythiophene) | polystyrenesulfonic acid | — |
| Comparative Example 3 |  | polyisoprenesulfonic acid | — |

TABLE 1-continued

| | π conjugated conductive polymer | Dopant | Nitrogen-containing aromatic cyclic compound |
|---|---|---|---|
| Comparative Example 4 | polypyrrole | polystyrenesulfonic acid | — |

(Evaluation Method)
Electric conductivity (S/cm):
 The electric conductivity of the coatings was measured by LORESTA (manufactured by Mitsubishi Chemical Corporation).
 Retention rate of electrical conductivity depending on heat (%):
 The electric conductivity R25B of the coatings was measured by LORESTA (manufactured by Mitsubishi Chemical Corporation) at a temperature of 25° C. Then, the coating was allowed to stand at 125° C. for 300 hours. The temperature of the coating was returned to 25° C. and the electric conductivity R25A was measured. The obtained values were applied to the following equation to obtain a retention rate of electric conductivity depending on heat. The retention rate of electric conductivity depending on heat is an indicator for heat resistance.
 Retention rate of electric conductivity depending on heat (%)=100×R25A/R25B Rate of change of electric conductivity depending on humidity (%):
 The electric conductivity R25B of the coatings was measured at 25° C. and at a humidity of 60% RH. Then, the coating was allowed to stand at 180° C. and 90% RH for 200 hours. The temperature of the coating was returned to 25° C. and 60% RH and the electric conductivity R25A was measured. The obtained values were applied to the following equation to obtain a rate of change of electric conductivity depending on humidity. The rate of change of electric conductivity depending on humidity is an indicator for moisture resistance.
 Rate of change of electric conductivity depending on humidity (%)=100×(R25B−R25A)/R25B

TABLE 2

| | Electric conductivity (S/cm) | Retention rate of electric conductivity depending on heat (%) | Rate of change of electric conductivity depending on humidity (%) |
|---|---|---|---|
| Example 1 | 150 | 23.5 | 5.5 |
| Example 2 | 316 | 47 | 4.3 |
| Example 3 | 412 | 44.2 | 4.1 |
| Example 4 | 373 | 49.1 | 5.2 |
| Example 5 | 242 | 85.4 | 3.0 |
| Example 6 | 198 | 83 | 2.7 |
| Example 7 | 186 | 87.2 | 4.2 |
| Example 8 | 112 | 97.3 | 10.5 |
| Example 9 | 257 | 34.3 | 3.2 |
| Example 10 | 163 | 38.5 | 3.5 |
| Example 11 | 172 | 32.1 | 2.9 |
| Comparative Example 1 | 0.25 | 0.8 | −380 |
| Comparative Example 2 | 5.6 | 12.5 | −480 |
| Comparative Example 3 | 2.3 | 8.7 | −491 |
| Comparative Example 4 | 5.1 | 0.7 | −416 |

Examples 2 to 4

Using the π conjugated conductive polymer A obtained in Example 1, conductive composition coatings were obtained and evaluated in the same manner as in Example 1 except that 1.67 g (Example 2), 2.79 g (Example 3), or 5.57 g (Example 4) of imidazole was added in place of 0.56 g. The results are shown in Table 2.

Examples 5 to 7

Conductive composition coatings were obtained and evaluated in the same manner as in Example 1 except that 2.36 g (Example 5), 3.93 g (Example 6), or 7.67 g (Example 7) of 1,2-dimethylimidazole was added to 100 ml of the π conjugated conductive polymer A obtained in Example 1 in place of imidazole. The results are shown in Table 2.

Example 8

A conductive composition coating was obtained and evaluated in the same manner as in Example 1 except that 1.3 g of pyridinesulfonic acid was added to 100 ml of the π conjugated conductive polymer A obtained in Example 1 in place of imidazole. The results are shown in Table 2.

Example 9

A solution of polyisoprenesulfonic acid doped poly(3,4-ethylenedioxythiophene) was obtained in the same manner as in Example 1 except that 22.2 g (0.15 mol) of polyisoprenesulfonic acid was used in place of polystyrenesulfonic acid. The solution was diluted to 1.5% by weight with ion-exchanged water to obtain a π conjugated conductive polymer solution B.
 The amount of 1.67 g of imidazole was uniformly dispersed in 100 ml of the π conjugated conductive polymer solution B to obtain a conductive composition solution. The conductive composition solution was applied to a glass and dried in an oven at 150° C. to obtain a conductive composition coating. The obtained coating was evaluated for electric properties in the same manner as in Example 1. The results are shown in Table 2.

Example 10

The amount of 6.8 g (0.1 mol) of pyrrole and a solution of 27.5 g (0.15 mol) of polystyrenesulfonic acid in 2000 ml of ion-exchanged water were mixed and cooled to 0° C.
 An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining at 20° C. and stirring. Then, the mixture was stirred and allowed to react for 3 hours.
 The obtained reaction solution was treated in the same manner as in Example 1 to obtain a polystyrenesulfonic acid doped polypyrrole solution. The solution was diluted to 1.5% by weight with ion-exchanged water to obtain a π conjugated conductive polymer solution C.
 The amount of 1.67 g of imidazole was uniformly dispersed in 100 ml of the π conjugated conductive polymer solution C to obtain a conductive composition solution. The conductive composition solution was applied to a glass and dried in an oven at 150° C. to obtain a conductive composition coating. The obtained coating was evaluated for electric properties in the same manner as in Example 1. The results are shown in Table 2.

Example 11

A polyisoprenesulfonic acid doped polypyrrole solution was obtained in the same manner as in Example 1 except that 22.2 g (0.15 mol) of polyisoprenesulfonic acid was used in place of polystyrenesulfonic acid. The solution was diluted to 1.5% by weight with ion-exchanged water to obtain a π conjugated conductive polymer solution D.

The amount of 1.67 g of imidazole was uniformly dispersed in 100 ml of the π conjugated conductive polymer solution D to obtain a conductive composition solution. The conductive composition solution was applied to a glass and dried in an oven at 150° C. to obtain a conductive composition coating. The obtained coating was evaluated for electric properties in the same manner as in Example 1. The results are shown in Table 2.

Comparative Example 1

The amount of 6.8 g (0.1 mol) of pyrrole and a solution of 10.8 g (0.15 mol) of polyacrylic acid in 1000 ml of ion-exchanged water were mixed and cooled to 0° C.

An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining at 20° C. and stirring. Then, the mixture was stirred and allowed to react for 3 hours.

The obtained reaction solution was adjusted to pH 10 with aqueous ammonia (25% by weight), allowed to precipitate with isopropyl alcohol, and filtered. The filtrate was rinsed with ion-exchanged water three times. The filtrate was again dispersed in 1000 ml of ion-exchanged water to obtain an aqueous polyacrylic acid-polypyrrole colloid solution. The aqueous polyacrylic acid-polypyrrole colloid solution was applied to a glass and dried in an oven at 150° C. to obtain a conductive composition coating. The obtained coating was evaluated in the same manner as in Example 1. The results are shown in Table 2.

Comparative Examples 2 to 4

The π conjugated conductive polymer solution A obtained in Example 1 (polystyrenesulfonic acid doped poly(3,4-ethylenedioxythiophene) (PSS-PEDOT)), the π conjugated conductive polymer solution B obtained in Example 9 (polyisoprenesulfonic acid doped poly(3,4-ethylenedioxythiophene) (PIPS-PEDOT)), and the π conjugated conductive polymer solution C obtained in Example 10 (polystyrenesulfonic acid doped polypyrrole (PSS-PPY)) were applied to glasses as they were and dried in an oven at 150° C. to obtain conductive composition coatings. The obtained coatings were evaluated for electric properties in the same manner as in Example 1. The results are shown in Table 2.

Example 12

The amount of 3.16 g of N-vinylimidazole was added to 100 ml of the π conjugated conductive polymer solution A obtained in Example 1 in place of imidazole to obtain a π conjugated conductive polymer solution D. Using the it conjugated conductive polymer solution D, a conductive composition coating was obtained and evaluated in the same manner as in Example 1. The results are shown in Table 4.

Table 3 shows π conjugated conductive polymers, nitrogen-containing aromatic cyclic compounds, and cross-linkable compounds used in Examples 12 to 24.

TABLE 3

|  | π conjugated conductive polymer | Nitrogen-containing aromatic cyclic compound | Cross-linkable compound |
| --- | --- | --- | --- |
| Example 12 | poly(3,4-ethylenedioxy thiophene) | N-vinylimidazole | — |
| Example 13 |  |  | 2-hydroxyethylacrylate (UV polymerization) |
| Example 14 |  |  | 2-hydroxyethylacrylate (thermal polymerization) |
| Example 15 |  | 1-allylimidazole | — |
| Example 16 |  | 1-(2-hydoxyethyl)-imidazole | — |
| Example 17 |  | imidazole-4-carboxylic acid | — |
| Example 18 |  | 1-(2-hydroxyethyl)-imidazole | 5-sulfoisophthalic acid |
| Example 19 |  | 1-(2-hydroxyethyl)-imidazole | 5-sulfoisophthalic acid |
| Example 20 |  | imidazole-4-carboxylic acid | ethylene glycol |
| Example 21 |  | 1-(2-hydroxyethyl)-imidazole | ethylene glycol |
| Example 22 |  | 2-vinylpyridine | — |
| Example 23 | polypyrrole | N-vinylimidazole | — |
| Example 24 |  |  | 2-hydroxyethylacrylate |

Example 13

A conductive composition solution was obtained in the same manner as in Example 1 except that 3.16 g of N-vinylimidazole was added to 100 ml of the π conjugated conductive polymer solution A obtained in Example 1 in place of imidazole and 3.0 g of 2-hydroxyethylacrylate and 0.01 g of 1-[4-(2-hydroxyethoxy)-phenyl]-2-methyl-1-propane-1-on (UV polymerization initiator) were further added. The obtained solution was applied to a glass, dried in an oven at 100° C. to remove moisture, and UV irradiated by a UV

Example 14

A conductive composition coating was obtained and evaluated in the same manner as in Example 1 except that 3.16 g of N-vinylimidazole was added to 100 ml of the π conjugated conductive polymer solution A obtained in Example 1 in place of imidazole and 3.0 g of 2-hydroxyethylacrylate and 0.02 g of ammonium persulfate (thermal polymerization initiator) were further added. The results are shown in Table 4.

Example 15

A conductive composition coating was obtained and evaluated in the same manner as in Example 1 except that 3.83 g of 1-allylimidazole was added to 100 ml of the π conjugated conductive polymer solution A obtained in Example 1 in place of imidazole. The results are shown in Table 4.

Example 16

A conductive composition coating was obtained and evaluated in the same manner as in Example 1 except that 3.97 g of 1-(2-hydroxyethyl)-imidazole was added to 100 ml of the π conjugated conductive polymer solution A obtained in Example 1 in place of imidazole. The results are shown in Table 4.

Example 17

A conductive composition coating was obtained and evaluated in the same manner as in Example 1 except that 3.97 g of imidazole-4-carboxylic acid was added to 100 ml of the π conjugated conductive polymer solution A obtained in Example 1 in place of imidazole. The results are shown in Table 4.

Example 18

A conductive composition coating was obtained and evaluated in the same manner as in Example 16 except that 1.2 g of 5-sulfoisophthalic acid was further added to 50 ml of the π conjugated conductive polymer solution A obtained in Example 16. The results are shown in Table 4.

Example 19

A conductive composition coating was obtained and evaluated in the same manner as in Example 16 except that 1.2 g of 5-sulfoisophthalic acid and 2.0 g of polyester solution (brand name: PLASCOAT Z-561, manufactured by Goo Chemical Co., Ltd.) were added to 50 ml of the π conjugated conductive polymer solution A obtained in Example 16. The results are shown in Table 4.

Example 20

A conductive composition coating was obtained and evaluated in the same manner as in Example 17 except that 0.25 g of ethylene glycol was further added to 50 ml of the π conjugated conductive polymer solution A obtained in Example 17. The results are shown in Table 4.

Example 21

A conductive composition coating was obtained and evaluated in the same manner as in Example 16 except that 0.25 g of ethylene glycol and 1.8 g of polyurethane solution (brand name: REZAMINE D-4080, manufactured by Dainichiseika Color & Chemicals Mfg. Co., Ltd.) were further added to 50 ml of the π conjugated conductive polymer solution A obtained in Example 16. The results are shown in Table 4.

Example 22

A conductive composition coating was obtained and evaluated in the same manner as in Example 1 except that 1.8 g of 2-vinylpyridine was added to 100 ml of the π conjugated conductive polymer solution A obtained in Example 1 in place of N-vinylimidazole. The results are shown in Table 4.

Example 23

A conductive composition coating was obtained and evaluated in the same manner as in Example 10 except that 4.73 g of N-vinylimidazole was uniformly dispersed in 100 ml of the π conjugated conductive polymer solution C obtained in Example 10 in place of 1.67 g of imidazole. The results are shown in Table 4.

Example 24

A conductive composition coating was obtained and evaluated in the same manner as in Example 10 except that 4.73 g of N-vinylimidazole was uniformly dispersed in 100 ml of the π conjugated conductive polymer solution C obtained in Example 10 in place of 1.67 g of imidazole and 2-hydroxyethylacrylate was further added. The results are shown in Table 4.

TABLE 4

| | Electric conductivity (S/cm) | Retention rate of electric conductivity depending on heat (%) | Rate of change of electric conductivity depending on humidity (%) |
| --- | --- | --- | --- |
| Example 12 | 382 | 54.3 | 10.3 |
| Example 13 | 272 | 63.8 | 4.5 |
| Example 14 | 365 | 61.0 | 2.5 |
| Example 15 | 294 | 57.2 | 8.9 |
| Example 16 | 231 | 49.0 | 9.3 |
| Example 17 | 175 | 47.0 | 15.0 |
| Example 18 | 235 | 35.0 | 3.2 |
| Example 19 | 134 | 89.0 | 3.7 |
| Example 20 | 325 | 79.4 | −1.0 |
| Example 21 | 274 | 61.3 | 5.5 |
| Example 22 | 179 | 49.3 | 9.3 |
| Example 23 | 89 | 42.0 | 8.7 |
| Example 24 | 143 | 47.5 | 5.4 |

Every conductive compositions of Examples 1 to 24, which contained a π conjugated conductive polymer, a dopant, and a nitrogen-containing aromatic cyclic compound, had high electric conductivities. They also had high retention rate of electric conductivity depending on heat and were stable for temperature changes. Electric conductivity was not increased at high temperatures and high humidity, which indicated that the compositions also had excellent moisture resistance. Particularly, the conductive compositions of Examples 12 to 14, which contained a nitrogen-containing aromatic cyclic compound having a cross-linkable functional group, were highly heat-stable. Further, their stability can be further improved by additional use of other cross-linkable compounds.

On the other hand, the conductive compositions of Comparative Examples 1 to 4, which did not contain nitrogen-containing aromatic cyclic compounds, had electric conductivities two orders lower than Examples. The retention rate of electric conductivity depending on heat was extremely low and the rate of change of electric conductivity depending on humidity was high.

[Capacitor]

Preparation Example 3

Preparation of a Conductive Polymer Solution

The amount of 14.2 g (0.1 mol) of 3,4-ethylenedioxythiophene and a solution of 27.5 g (0.15 mol) of polystyrenesulfonic acid (molecular weight: approximately 150000) in 2000 ml of ion-exchanged water were mixed at 20° C.

An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining at 20° C. and stirring. Then, the mixture was stirred and allowed to react for 3 hours.

The obtained reaction solution was dialyzed to remove unreacted monomers and oxidant. A conductive polymer solution containing approximately 1.5% by weight of blue polystyrenesulfonic acid doped poly(3,4-ethylenedioxythiophene) was obtained.

Preparation Example 4

Preparation of an Electron Donor Compound Solution

The amount of 7.79 g of imidazole was dissolved in 100 ml of distilled water to obtain an electron donor compound solution.

Preparation Example 5

Preparation of an Electron Donor Compound Solution

The amount of 10 g of pyrrole was dissolved in 100 ml of methylethylketone to obtain an electron donor compound solution.

Example 25

An etched aluminum foil was connected to an anode lead terminal and subject to chemical conversion (oxidation) in 10% by weight of ammonium adipate in water to form a dielectric layer on the aluminum foil surface, by which an anode foil was obtained.

A cellulose separator was inserted between the anode foil and a facing aluminum cathode foil welded to a cathode lead terminal, which was then rolled up to obtain a capacitor element.

The capacitor element was immersed in the electron donor compound solution prepared in Preparation Example 4 under reduced pressure and dried in a hot air drier at 120° C. for two minutes. Then, the capacitor element was immersed in the conductive polymer solution prepared in Preparation Example 3 under reduced pressure and dried in a hot air drier at 150° C. for 10 minutes. The immersion in the conductive polymer solution was repeated five times to form a solid electrolyte layer containing a π conjugated conductive polymer on the dielectric layer surface.

Then, the capacitor element having the solid electrolyte layer was mounted in an aluminum case and sealed with a sealing rubber to obtain a capacitor.

The electrostatic capacity at 120 Hz, initial equivalent series resistance (ESR) at 100 kHz, ESR at 125° C. and after 1000 hours of the obtained capacitor were measured. The results are shown in Table 5. The ESR is an indicator for impedance.

TABLE 5

|  |  | Example 25 | Example 26 | Comparative Example 5 |
|---|---|---|---|---|
| Electrostatic capacity (μm) |  | 47.8 | 46.2 | 3.4 |
| ESR (mΩ) | Initial | 15 | 22 | 587 |
|  | 125° C., after 1000 hours | 21 | 31 | 1035 |

Example 26

A capacitor was obtained in the same manner as in Example 25 except that the electron donor compound solution prepared in Preparation Example 5 was used. The capacitor was evaluated in the same manner as in Example 25. The results are shown in Table 5.

Comparative Example 5

A capacitor was obtained and evaluated in the same manner as in Example 25 except that the capacitor element was not immersed in the electron donor compound solution. The results are shown in Table 5.

The capacitor of Examples 25 and 26 wherein the electron donor compound was applied to the dielectric layer surface had high electrostatic capacities and low ESRs (low impedances). In addition, the ESRs after heated were prevented from decreasing; the capacitor had excellent heat resistance.

On the other hand, the capacitor of Comparative Example 1 wherein the electron donor compound was not applied to the dielectric layer surface had a low electrostatic capacity and high ESRs (high impedances). In addition, the ESRs after heated were significantly increased after heated; the capacitor had low heat resistance.

Preparation Example 6

Preparation of a conductive Polymer Solution

The amount of 14.2 g (0.1 mol) of 3,4-ethylenedioxythiophene and a solution of 27.5 g (0.15 mol) of polystyrenesulfonic acid (molecular weight: approximately 150,000) in 2000 ml of ion-exchanged water were mixed at 20° C.

An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining at 20° C. and stirring. Then, the mixture was stirred and allowed to react for 3 hours.

The obtained reaction solution was dialyzed to remove unreacted monomers and oxidant. A solution containing approximately 1.5% by weight of blue polystyrenesulfonic acid doped poly(3,4-ethylenedioxythiophene) was obtained. Then, 2.79 g of imidazole was uniformly dispersed in 100 ml of the solution to obtain a conductive polymer solution. In order to evaluate the π conjugated conductive polymer, the obtained conductive polymer solution was applied to a glass and dried in a hot air drying machine at 120° C. to form a conductive coating having a thickness of 2 μm. The electric conductivity of the coating was measured by LORESTA (manufactured by Mitsubishi Chemical Corporation). The results are shown in Table 6.

TABLE 6

|  | Example 27 (Preparation Example 6) | Example 28 | Comparative Example 6 | Comparative Example 7 |
|---|---|---|---|---|
| Electrostatic capacity (μm) | 47.5 | 47.2 | 48.1 | 48.3 |
| Electric conductivity (S/cm) | 420 | 610 | 3 | 20 |
| ESR (mΩ) Initial | 5 | 4 | 48 | 35 |
| 125° C., after 1000 hours | 7 | 7 | 579 | 864 |

Example 27

An etched aluminum foil (anode foil) was connected to an anode lead terminal and subject to chemical conversion (oxidation) in a solution of 10% by weight of ammonium adipate in water to form a dielectric layer on the aluminum foil surface, by which a capacitor intermediate was obtained.

The capacitor intermediate and a facing aluminum cathode foil welded to a cathode lead terminal were laminated and rolled up to obtain a capacitor element. A separator was provided between the anode and cathode foils of the capacitor intermediate.

The capacitor element was immersed in the conductive polymer solution prepared in Preparation Example 6 and then dried in a hot air drying machine at 120° C. to form a solid electrolyte layer on the dielectric layer surface of the capacitor intermediate.

Then, the capacitor element having the solid electrolyte layer and an electrolyte of 20% by weight of hydrogen ammonium adipate –80% by weight of ethylene glycol were mounted in an aluminum case and the aluminum case was sealed with a sealing rubber to obtain a capacitor.

The electrostatic capacity at 120 Hz, initial equivalent series resistance (ESR) at 100 kHz, ESR at 125° C. and after 1000 hours of the obtained capacitor were measured by LCZ meter 2345 (manufactured by NF Corporation).

Example 28

An etched aluminum foil (anode foil) was connected to an anode lead terminal and subject to chemical conversion (oxidation) in a solution of 10% by weight of ammonium adipate in water to form a dielectric layer on the aluminum foil surface, by which a capacitor intermediate was obtained.

The capacitor intermediate and a facing aluminum cathode foil welded to a cathode lead terminal were laminated and rolled up to obtain a capacitor element. A separator was provided between the anode and cathode foils of the capacitor intermediate.

The capacitor element was mounted in an aluminum case. A 1:2 mixture of a solution of 30% by weight of ethylene glycol in pyrrole and a solution of 20% by weight of ethylene glycol in imidazole was allowed to soak. Then, a solution of 10% by weight of ethylene glycol in iron p-toluenesulfonate was allowed to soak to chemical oxidative polymerize pyrrole. After the polymerization, the capacitor element was rinsed, dried, and sealed with a sealing rubber to obtain a capacitor.

The electrostatic capacity at 120 Hz, initial equivalent series resistance (ESR) at 100 kHz, ESR at 125° C. and after 1000 hours of the obtained capacitor were measured.

A 1:2 mixture of a solution of 30% by weight of ethylene glycol in pyrrole and a solution of 20% by weight of ethylene glycol in imidazole was applied to a glass and a solution of 10% by weight of ethylene glycol in iron p-toluenesulfonate was dropped thereon to chemical oxidative polymerize pyrrole. After rinsed and dried, a conductive coating was formed. The electric conductivity of the conductive coating was measured.

The results are shown in Table 6.

Comparative Example 6

A capacitor was obtained in the same manner as in Example 27 except that the imidazole was not added in the preparation of the conductive polymer solution of Preparation Example 6.

The electrostatic capacity at 120 Hz, initial equivalent series resistance (ESR) at 100 kHz, ESR at 125° C. and after 1000 hours of the obtained capacitor were measured. The results are shown in Table 6.

Comparative Example 7

A capacitor was obtained in the same manner as in Preparation Example 2 except that a solution of 20% by weight of ethylene glycol in imidazole was not added in the preparation of the capacitor of Preparation Example 2.

The electrostatic capacity at 120 Hz, initial equivalent series resistance (ESR) at 100 kHz, ESR at 125° C. and after 1000 hours of the obtained capacitor were measured. The results are shown in Table 6.

Example 29

A capacitor was obtained and evaluated in the same manner as in Example 27 except that 3.85 g of vinylimidazole was used in the conductive polymer solution obtained in Preparation Example 6 in place of imidazole. The results are shown in Table 7.

TABLE 7

|  | Example 29 | Example 30 | Example 31 | Example 32 | Example 33 |
|---|---|---|---|---|---|
| Electrostatic capacity (μm) | 54 | 67 | 68 | 183 | 194 |
| Electric conductivity (S/cm) | 435 | 412 | 357 | 412 | 453 |

TABLE 7-continued

|  |  | Example 29 | Example 30 | Example 31 | Example 32 | Example 33 |
|---|---|---|---|---|---|---|
| ESR (mΩ) | Initial | 5 | 5 | 5 | 10 | 9 |
|  | 125° C., after 1000 hours | 7 | 6 | 7 | 12 | 12 |

Example 30

A capacitor was obtained and evaluated in the same manner as in Example 27 except that 3.85 g of vinylimidazole was used in the conductive polymer solution obtained in Preparation Example 6 in place of imidazole and 1.4 g of acrylic acid and 0.02 g of ammonium persulfate were added. The results are shown in Table 7.

Example 31

A capacitor was obtained and evaluated in the same manner as in Example 27 except that 3.3 g of 1-ethylhydroxyimidazole was used in the conductive polymer solution obtained in Preparation Example 6 in place of imidazole and 1.4 g of acrylic acid was added. The results are shown in Table 7.

Example 32

An etched aluminum foil (anode foil) was connected to an anode lead terminal and subject to chemical conversion (oxidation) in a solution of 10% by weight of ammonium adipate in water to form a dielectric layer on the aluminum foil surface, by which a capacitor intermediate was obtained.

The capacitor intermediate was immersed in the conductive polymer solution prepared in Example 30 and dried in a hot air drying machine at 120° C. to form a solid electrolyte layer on the dielectric layer surface of the capacitor intermediate.

Then, a carbon paste was applied to the solid electrolyte layer and dried in a hot air drier at 120° C. A silver paste was further applied to form a conductive layer, which was dried in a hot air drier at 120° C., by which a cathode was formed.

A lead terminal was connected to the cathode and rolled up to form a capacitor element. A separator was provided between the anode and cathode foils of the capacitor.

Then, the capacitor element having the solid electrolyte layer was mounted in an aluminum case and sealed with a sealing rubber to form a capacitor. The capacitor was evaluated in the same manner as in Example 27. The results are shown in Table 7.

Example 33

An etched aluminum foil (anode foil) was connected to an anode lead terminal and subject to chemical conversion (oxidation) in a solution of 10% by weight of ammonium adipate in water to form a dielectric layer on the aluminum foil surface, by which a capacitor intermediate was obtained.

Then, a conductive polymer solution was obtained in the same manner as in Example 6 except that 3.85 g of vinylimidazole was used in place of imidazole and 1.4 g of acrylic acid and 0.01 g of 1-[4-(2-hydroxyethoxy)-phenyl]-2-methyl-1-propane-1-on were added. The capacitor intermediate was immersed in this solution, dried in a hot air drier at 120° C. to remove moisture, UV irradiated using a UV irradiator to form a solid electrolyte layer on the dielectric layer side surface of the capacitor.

Then, a carbon paste was applied to the obtained solid electrolyte layer and dried in a hot air drier at 120° C. A silver paste was further applied to form a conductive layer, which was dried in a hot air drier at 120° C., by which a cathode was formed.

A lead terminal was connected to the cathode and rolled up to form a capacitor element. A separator was provided between the anode and cathode foils of the capacitor.

Then, the capacitor element having the solid electrolyte layer was mounted in an aluminum case and sealed with a sealing rubber to form a capacitor. The capacitor was evaluated in the same manner as in Example 27. The results are shown in Table 7.

The capacitors of Examples 27, 28, and 29 to 33, which contains a nitrogen-containing aromatic cyclic compound in the solid electrolyte layer of the cathode, had highly conductive cathodes and low equivalent series resistances. In Example 27, the solid electrolyte layer was simply formed by applying the conductive polymer solution and drying it. The capacitors of Examples 29 to 33, which contained the cross-linked nitrogen-containing aromatic cyclic compound in the solid electrolyte layer of the cathode, had excellent electrostatic capacities and low equivalent series resistances.

On the other hand, the capacitors of Comparative Examples 6 and 7, which did not contain a nitrogen-containing aromatic cyclic compound in the solid electrolyte layer of the cathode, had low conductive cathodes and high equivalent series resistances.

Preparation Example 7

Synthesis of an Electron Attractive Group-Containing Solubilizing Polymer

The amount of 50 g of acrylonitrile and 10 g of styrene were dissolved in 500 ml of toluene. 1.5 g of azoisobutyronitrile was added as a polymerization initiator. The mixture was allowed to polymerize at 50° C. for 5 hours. Then, a polymer obtained from the polymerization was rinsed with methanol.

Preparation Example 8

Synthesis of an Anion Group-Containing Solubilizing Polymer

Sodium ethylsulfonate methacrylate (brand name: Antox, manufactured by Nippon Nyukazai Co., Ltd.) was added in the amount of 43.3 g to ion-exchanged water (100 ml). A complex oxidant solution of 0.114 g of ammonium persulfate and 0.04 g of iron (II) sulfate previously dissolved in 10 ml of ion-exchanged water was added to the mixture while maintaining at 80° C. and stirring. Then, the mixture was stirred at 80° C. for 3 hours.

After the reaction, the reaction solution was cooled to the room temperature. Ion-exchanged water was added in the amount of 1000 ml and then, 30 g of 50% by weight aqueous sulfuric acid was added. Then, the solution was concentrated to 300 ml. This operation was repeated four times.

Ion-exchanged water was added in the amount of 2000 ml and the solution was concentrated to 300 ml. This operation was until the permeated solution was neutralized. The obtained concentrate was dried in an oven to obtain a poly (ethylsulfonate methacrylate).

Preparation Example 9

Synthesis of a Solubilizing Polymer that is a Copolymer of an Anion Group-Containing Component and an Electron Attractive Group-Containing Component Sodium ethylsulfonate acrylate in the amount of 40 g and 30 g of methacrylonitrile were added to 500 ml of acetonitrile and ion-exchanged water (7:3). A complex oxidant solution of 0.14 g of ammonium persulfate and 0.04 g of iron (II) sulfate previously dissolved in 10 ml of ion-exchanged water was added to the mixture while maintaining at 80° C. and stirring. Then, the mixture was stirred at 80° C. for 3 hours.

After the reaction, the reaction solution was cooled to the room temperature. The amount of 1000 ml of ion-exchanged water was added and, then, 30 g of 50% by weight aqueous sulfuric acid was added. Then, the solution was concentrated to 300 ml. This operation was repeated four times.

Then, 2000 ml of ion-exchanged water was added and the solution was concentrated to 300 ml. This operation was repeated until the permeated solution was neutralized. The obtained concentrate was dried in an oven to obtain a copolymer of ethylsulfonate acrylate and methacrylonitrile.

Preparation Example 10

Synthesis of a Solubilizing Polymer that is a Copolymer of an Anion Group-Containing Component and an Electron Attractive Group-Containing Component Sodium styrenesulfonate in the amount of 206 g (1 mol) was dissolved in a mixed solvent of 400 g of ion-exchanged water, 100 g of acetonitrile, and 200 g of methanol to obtain a sodium styrenesulfonate solution. 33.5 g (0.5 mol) of methacrylonitrile in 100 g of ion-exchanged water, 400 g of acetonitrile, and 100 g of methanol was added to the obtained solution, allowed to disperse, and maintained at 80° C.

An oxidant solution of 1.14 g (0.005 mol) of ammonium persulfate previously dissolved in 10 ml of water was added dropwise over 20 min. and the solution was stirred for 8 hours.

A polystyrenesulfonic acid-polymethacrylonitrile copolymer was obtained from the sodium polystyrenesulfonate and polymethacrylonitrile copolymer solution obtained in the same manner as in Preparation Example 2.

[Preparation of an Antistatic Coating Material]

Example 34

The amount of 10 g of the solubilizing polymer of Example 7 was dissolved in 90 g of acetonitrile. The amount of 50 g of 3,4-ethylenedioxythiophene and 20 g of sodium octadecylnaphthalenesulfonate were added. The mixture was stirred for 1 hour while cooling at 10° C.

An oxidant solution of 250 g of iron (II) chloride in 1250 ml of acetonitrile was added dropwise to the solution over 2 hours while maintaining at 10° C. The mixture was further stirred for 12 hours to polymerize 3,4-ethylenedioxythiophene.

After the reaction, 200 ml of methanol was added to the 3,4-ethylenedioxythiophene polymer solution, which was then filtered and rinsed to separate the precipitate. The precipitate was dissolved in dimethylformamide (DMF) to a concentration of 2% by weight. 100 ml of this solution was mixed with 1.1 g of imidazole and stirred to obtain an antistatic coating material.

This antistatic coating material was applied to a PET film having a thickness of 25 μm using a comma coater and dried to form an antistatic coating having a thickness of 0.1 μm. The surface resistance at 10° C., 15% RH was measured by a HIRESTA manufactured by Dia Instruments Co., Ltd. using MCP-HTP16 as a probe. The total light transmittance (JIS Z 8701) and haze (JIS K 6714) were measured. The results are shown in Table 8.

TABLE 8

| | Example 34 | Example 35 | Example 36 | Example 37 | Comparative Example 8 |
|---|---|---|---|---|---|
| Surface resistance (Ω) | $2 \times 10^4$ | $3 \times 10^6$ | $2 \times 10^3$ | $3 \times 10^5$ | $8 \times 10^7$ |
| Total light transmittance (%) | 90.1 | 86.3 | 90.5 | 98.5 | 90.0 |
| Haze (%) | 2.2 | 3.9 | 2.5 | 0.2 | 2.1 |

Example 35

The amount of 10 g of the solubilizing polymer of Example 7 was dissolved in 90 g of acetonitrile. The amount of 50 g of pyrrole and 20 g of p-toluenesulfonic acid were added. The mixture was stirred for 1 hour while cooling at −20° C.

An oxidant solution of 250 g of iron (II) chloride in 1250 ml of acetonitrile was added dropwise to the solution over 2 hours while maintaining at −20° C. The mixture was further stirred for 12 hours to polymerize pyrrole.

After the reaction, 2000 ml of methanol was added to the pyrrole polymer solution, which was then filtered and rinsed to separate the precipitate. The precipitate was dissolved in dimethylformamide (DMF) to a concentration of 2% by weight. 100 ml of this solution was mixed with 1.1 g of imidazole and, then, with thermoplastic polyurethane resin and stirred to obtain an antistatic coating material.

The antistatic coating material was evaluated in the same manner as in Example 34. The results are shown in Table 8.

Example 36

The amount of 10 g of the solubilizing polymer of Example 8 was dissolved in 90 g of water. 50 g of 3,4-ethylenedioxythiophene was added. The mixture was stirred for 1 hour while cooling at 5° C.

An oxidant solution of 250 g of iron (II) chloride in 1250 ml of water was added dropwise to the solution over 2 hours while maintaining at 5° C. The mixture was further stirred for 12 hours to polymerize 3,4-ethylenedioxythiophene.

After the reaction, the mixture was refined by ultrafiltration to remove oxidant residue and unreacted monomers and concentrated to a concentration of 2% by weight. The amount of 100 ml of the solution was mixed with 1.1 g of imidazole and stirred to obtain an antistatic coating material.

The antistatic coating material was evaluated in the same manner as in Example 34. The results are shown in Table 8.

Example 37

The amount of 10 g of the solubilizing polymer of Example 9 was dissolved in 90 g of water. 50 g of 3,4-ethylenedioxythiophene was added. The mixture was stirred for 1 hour while cooling at 0° C.

An oxidant solution of 200 g of ammonium persulfate in 1250 ml of water was added in drops to the solution over 2 hours while maintaining at 0° C. The mixture was further stirred for 12 hours to polymerize 3,4-ethylenedioxythiophene.

After reaction, the mixture was refined by ultrafiltration to remove oxidant residue and unreacted monomers and concentrated to a concentration of 2% by weight. The amount of 100 ml of the solution was mixed with 1.1 g of imidazole and then with allylmethacrylate and further with urethane acrylate (manufactured by Negami Chemical Industrial Co., Ltd.) as a hard coat component, and stirred to obtain an antistatic coating material.

The antistatic coating material was evaluated in the same manner as in Example 34. The results are shown in Table 8.

Comparative Example 8

The process of Example 34 was repeated except that imidazole was not added. The evaluation results are shown in Table 8.

Example 38

The amount of 14.2 g (1 mol) of 3,4-ethylenedioxythiophene and a solution of 27.5 g (0.15 mol) of polystyrenesulfonic acid in 2000 ml of ion-exchanged water were mixed at 20° C.

An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining 20° C. and stirring. The mixture was stirred and allowed to react for 3 hours.

Ion-exchanged water in the amount of 2000 ml of was added to the obtained reaction solution and approximately 2000 ml of the solution was removed by ultrafiltration. This operation was repeated three times.

The amount of 200 ml of 10% by weight diluted sulfuric acid and 2000 ml of ion-exchanged water were added to the filtered solution and approximately 2000 ml of the filtered solution was removed. 2000 ml of ion-exchanged water was added and approximately 2000 ml of the solution was removed. This operation was repeated three times.

Then, 2000 ml of ion-exchanged water was added to the obtained filtered solution and approximately 2000 ml of the filtered solution was removed. This operation was repeated five times. Approximately 1.5% by weight of blue polystyrenesulfonic acid doped poly(3,4-ethylenedioxythiophene) was obtained, which was used as a π conjugated conductive polymer solution.

N-vinylimidazole in the amount of 3.16 g was uniformly dispersed in 100 ml of the obtained π conjugated conductive polymer solution to obtain an antistatic coating material. The antistatic coating material was evaluated in the same manner as in Example 34. The results are shown in Table 9.

TABLE 9

| | Example 38 | Example 39 | Example 40 | Example 41 | Example 42 |
|---|---|---|---|---|---|
| Surface resistance (Ω) | $7 \times 10^3$ | $9 \times 10^3$ | $5 \times 10^3$ | $2 \times 10^4$ | $9 \times 10^3$ |
| Total light transmittance (%) | 97.3 | 94.3 | 95.6 | 95.4 | 91.7 |
| Haze (%) | 0.5 | 0.4 | 0.7 | 0.5 | 1.1 |

Example 39

An antistatic coating material was obtained by adding 3.83 g of 1-(2-hydroxyethyl)-imidazole and 2.18 g of 5-sulfoisophtalic acid in 100 ml of the π conjugated conductive polymer solution obtained in Example 40 in place of N-vinylimidazole. The antistatic coating material was evaluated in the same manner as in Example 34. The results are shown in Table 9.

Example 40

An antistatic coating material was obtained by adding 2.0 g of 2-hydroxyethylacrylate and 0.01 g of 1-[4-(2-hydroxyethoxy)-phenyl]-2-hydroxy-2-methyl-propan-1-on (UV polymerization initiator) to the antistatic coating material obtained in Example 40.

This antistatic coating material was applied to a PET film having a thickness of 25 μm using a comma coater, dried in an oven at 100° C. to remove moisture, and UV irradiated using a UV irradiator to obtain an antistatic coating. The electric properties of the coating were evaluated in the same manner as in Example 34. The results are shown in Table 9.

Example 41

An antistatic coating material was obtained by adding 3.83 g of 1-(2-hydroxyethyl)-imidazole and 1.8 g of polyurethane solution (brand name: REZAMINE D-4080, manufactured by Dainichiseika Color & Chemicals Mfg. Co., Ltd.) to 100 ml of a π conjugated conductive polymer solution obtained in Example 40 in place of N-vinylimidazole. The antistatic coating material was evaluated in the same manner as in Example 34. The results are shown in Table 9.

Example 42

The amount of 14.2 g (1 mol) of 3,4-ethylenedioxythiophene and a solution of 37.5 g (0.15 mol) of polystyrenesulfonic acid—polymethacrylonitrile copolymer in 2500 ml of ion-exchanged water was mixed at 20° C.

An oxidation catalysis solution of 29.64 g (0.13 mol) of ammonium persulfate and 8.0 g (0.02 mol) of iron (II) sulfate in 200 ml of ion-exchanged water was slowly added to the mixed solution while maintaining 20° C. and stirring. The mixture was stirred and allowed to react for 4 hours.

Ion-exchanged water in the amount of 3000 ml was added to the obtained reaction solution and approximately 3000 ml of the solution was removed by ultrafiltration. This operation was repeated three times.

The amount of 200 ml of 10% by weight diluted sulfuric acid and 3000 ml of ion-exchanged water were added to the filtered solution and approximately 3000 ml of the filtered solution was removed. The amount of 3000 ml of ion-exchanged water was added and approximately 3000 ml of the solution was removed. This operation was repeated three times.

Then, 3000 ml of ion-exchanged water was added to the obtained filtered solution and approximately 3000 ml of the filtered solution was removed. This operation was repeated five times. Approximately 1.5% by weight of blue polystyrenesulfonic acid doped poly(3,4-ethylenedioxythiophene) was obtained, which was used as a π conjugated conductive polymer solution.

The amount of 3.83 g of 1-(2-hydroxyethyl)-imidazole and 2.18 g of sulfoisophthalic acid were uniformly dispersed in 100 ml of the obtained π conjugated conductive polymer solution to obtain an antistatic coating material. The antistatic coating material was evaluated in the same manner as in Example 34. The results are shown in Table 9.

The antistatic coating materials of Examples 34 to 42, which contained a nitrogen-containing aromatic cyclic compound, ensured a transparent and highly conductive antistatic coating.

On the other hand, the antistatic coating material of Comparative Example 8, which did not contain a nitrogen-containing aromatic cyclic compound, gave low conductivity.

Example 43

Preparation of an Optical Filter

A PET film having an adhesive layer and a cover film on one surface (film base) was corona treated on the other surface. Then, the antistatic coating material of Example 37 was applied to the corona treated surface of the PET film. After dried, the surface was photo-cured by high pressure mercury lamp to form an antistatic coating that also serves as a hard coat layer.

Then, a solution of 80 g of a dispersion of finely porous hollow silica in ethanol (manufactured by Catalysts & Chemicals Industries Co., Ltd.; 15.6% by weight of solid components) with 42.0 g of ethanol was applied to the antistatic coating, dried, and heated at 100° C. for one hour to form an antireflection layer of 90 mm, by which an optical filter was obtained.

The visible light transmittance, haze, surface resistance, pencil hardness, adhesion of the obtained optical filter were evaluated.

[Visible Light Transmittance, Haze, Surface Resistance]

The visible light transmittance was 86.3%, haze was 1.4%, and surface resistance was $3\times10^5\Omega$.

These were measured in the same manner as for the antistatic coating.

[Pencil Hardness Test]

A hardness that did not cause any damage under a load of 9.8 N was determined using a test pencil specified by JIS S 6006 according to JIS K 5400. The obtained pencil hardness was 2H.

[Adhesion Test]

An adhesion test was conducted according to the grid taping method (JIS K 5400).

Specifically, 11 each of horizontal and vertical cuts were made at intervals of 1 mm on the antireflection layer side surface of the optical film (a total of 100 square grids were formed). An adhesive tape was applied thereon and peeled off. The number of grids in which the optical filter stayed on the PET film was counted. The result was that the optical film stayed in all the 100 grids (100/100).

As a conclusion, this optical filter was sufficiently hard and highly transparent, antistatic, and adhesive to a base.

Example 44

Production of an Optical Information Recording Medium

A first dielectric layer of 300 nm Ta2O5, an optical recording layer of 500 nm Tb—Fe, a second dielectric layer of 300 nm Ta2O5, and a metal reflection layer of 100 nm aluminum were formed on an injection molded polycarbonate disc base by sputtering. The antistatic coating material of Example 37 was applied to the metal reflection layer by a comma coater, dried, and photo-cured by a high pressure mercury lamp to form an antistatic coating that also serves as a hard coat layer, by which an optical information recording medium was obtained. This optical information recording medium was evaluated as follows.

[Surface Resistance, Pencil Hardness, Adhesion]

The surface resistance, pencil hardness, and adhesion were determined in the same manner as in Example 45. This optical information recording medium had a surface resistance of $3\times10^5\Omega$ and a pencil hardness of the antistatic coating of 2H. The adhesion test showed the antistatic coating stayed in all the 100 grids.

[Permeability]

The permeability of the antistatic coating for 780 and 635 nm, which were the emission wavelengths of the reading laser diode of the optical information recording medium, was measured. The permeability was 98.9% for 780 nm and 98.6% for 635 nm.

As a conclusion, this optical information recording medium was highly transparent for the wavelengths of 780 and 635 nm, antistatic, and damage resistant, and adhesive between the antistatic coating and the base.

The conductive composition of the present invention has applications in various fields where conductivity is required such as conductive coating materials, antistatic agents, electromagnetic shielding materials, essentially transparent conductive materials, battery materials, conductive adhesive materials, sensors, electronic device materials, semiconductor materials, electrostatic copying materials, photosensitive materials for printers, transferring bodies, intermediate transferring bodies, shipping materials, and electronic picture materials. The present invention can realizes a capacitor having a highly conductive and low impedance cathode in a simple manner. The present invention also realizes an antistatic coating that is conductive, flexible, and highly adhesive to a base simply by applying an antistatic coating material. The antistatic coating material yields sufficient antistatic property in small amounts, therefore reducing production cost. The antistatic coating material and antistatic coating have applications in various fields where antistatic property is required such as antistatic films, optical filters, and optical information recording media.

What is claimed is:

1. A capacitor comprising
   an anode composed of a porous material of valve metal,
   a dielectric layer formed by oxidizing a surface of the anode, and
   a cathode provided on the dielectric layer and comprising a solid electrolyte layer containing
   a π conjugated conductive polymer, and an anion group-containing solubilizing polymer, which comprises
   an electron donor compound layer containing an electron donor element provided between the dielectric layer and the cathode, wherein
   an electron donor compound of the electron donor compound layer is at least one compound selected from the group consisting of amines, alcohols, ethers, ketones, phosphoric acid ester, phosphorous acid ester, phosphonic acid, alkylphosphine, alkylphosphonium salt, sulfides, thiols, isocyanates, thiophenes and their derivatives.

2. The capacitor according to claim 1, wherein the electron donor element of the electron donor compound layer is at least one element selected from the group consisting of nitrogen, oxygen, sulfur, and phosphorus.

3. The capacitor according to claim 1, wherein the electron donor compound of the electron donor compound layer is at least one compound selected from the group consisting of pyrroles, thiophenes, and furans.

4. The capacitor according to claim 1, wherein the electron donor compound of the electron donor compound layer is amines.

5. The capacitor according to claim 1, wherein the ir conjugated conductive polymer is at least one polymer selected from the group consisting of polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(hexyloxythiophene), poly(3-heptyloxythiophene), poly(3-octyloxythiophene), poly(3-decyloxythiophene), poly(3-dodecyloxythiophene), poly(3-octadecyloxythiophene), poly(3-methyl-4-methoxythiophene), poly(3,4-ethylenedioxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

6. The capacitor according to claim 1, wherein the π conjugated conductive polymer is a (co)polymer composed of one or two compounds selected from the group consisting of polypyrrole, polythiophene, poly(N-methylpyrrole), poly(3-methylthiophene), poly(3-methoxythiophene), and poly(3,4-ethylenedioxythiophene).

7. The capacitor according to claim 1, wherein the π conjugated conductive polymer is a (co)polymer composed of polypyrrole and/or poly(3,4-ethylenedioxythiophene).

8. The capacitor according to claim 1, wherein the solubilizing polymer containing an anion group is at least one polymer selected from the group consisting of polyvinylsulfonic acid, polystyrenesulfonic acid, polyallylsulfonic acid, ethyl polyacrylatesulfonic acid, butyl polyacrylatesulfonic acid, polyacrylsulfonic acid, polymethacrylsulfonic acid, poly-2-acrylamide-2-methylpropanesulfonic acid, polyisoprenesulfonic acid, polystyrene carboxylic acid, poly-2-acrylamide-2-methylpropane carboxylic acid, polyisoprenecarboxylic acid, and polyacrylic acid.

9. The capacitor according to claim 1, wherein the electron donor compound is at least one selected from the group consisting of ethylamine, diethylamine, methylethylamine, and triethylamine, aniline, benzylamine, pyrrole, imidazole, pyridine, pyrimidine, pyrazine, and triazine, and their derivatives; lauryl alcohol, hexadecyl alcohol, benzyl alcohol, ethylene glycol, propylene glycol, glycerin, diphenyl ether, cyclohexane, diacetone alcohol, isophorone, furan, and their derivatives; trimethyl phosphate, triphenyl phosphate, trimethyl phosphite, triethyl phosphite, dimethyl phosphonate, diethyl phosphonate, triethylphosphine, tri-n-butylphosphine, tri-n-butylphosphineoxide, tetraethylphosphoniumbromide, tetra-n-butylphosphoniumbromide, dimethylsulfide, diethylsulfide, methylmercaptan, ethylmercaptan, phenylisothiocyanate, n-butylisocyanate, thiophene and 3-methylthiophene.

* * * * *